US010025145B2

(12) United States Patent
Tamaki et al.

(10) Patent No.: US 10,025,145 B2
(45) Date of Patent: Jul. 17, 2018

(54) DISPLAY DEVICE AND ELECTRONIC APPARATUS

(71) Applicant: Japan Display Inc., Tokyo (JP)

(72) Inventors: Masaya Tamaki, Tokyo (JP); Yoko Fukunaga, Tokyo (JP)

(73) Assignee: Japan Display Inc., Tokyo (JP)

( * ) Notice: Subject to any disclaimer, the term of this patent is extended or adjusted under 35 U.S.C. 154(b) by 133 days.

(21) Appl. No.: 15/337,442

(22) Filed: Oct. 28, 2016

(65) Prior Publication Data

US 2017/0045786 A1    Feb. 16, 2017

Related U.S. Application Data

(63) Continuation of application No. 14/198,186, filed on Mar. 5, 2014, now Pat. No. 9,507,203.

(30) Foreign Application Priority Data

Mar. 25, 2013  (JP) .................................. 2013-063107

(51) Int. Cl.
*G02F 1/1335*  (2006.01)
*G02F 1/1343*  (2006.01)
(Continued)

(52) U.S. Cl.
CPC .... *G02F 1/134309* (2013.01); *G02F 1/13394* (2013.01); *G02F 1/133555* (2013.01);
(Continued)

(58) Field of Classification Search
CPC ......... G02F 1/134309; G02F 1/133555; G02F 2001/134345; G02F 1/13394;
(Continued)

(56) References Cited

U.S. PATENT DOCUMENTS

2002/0167477 A1* 11/2002 Tsutsui ................. G09G 3/3648
345/89
2009/0128473 A1   5/2009 Yamashita et al.
(Continued)

FOREIGN PATENT DOCUMENTS

JP      05-181131        7/1993
JP      H06-324306 A    11/1994
(Continued)

OTHER PUBLICATIONS

Korean Office Action dated Sep. 3, 2015, for corresponding Korean Application No. 10-2014-0031593.
(Continued)

*Primary Examiner* — Charles Chang
(74) *Attorney, Agent, or Firm* — Michael Best & Friedrich LLP

(57) ABSTRACT

According to an aspect, a display device includes a plurality of pixels each including a plurality of sub-pixels. Each of the sub-pixels is arranged around center of the corresponding pixel and divided into a plurality of display regions to perform N-bit area coverage modulation by a combination of the display regions. The display regions are arranged in such a manner that: a display region corresponding to a least significant bit of the area coverage modulation is arranged closest to the center of the corresponding pixel; and a display region corresponding to a higher significant bit of the area coverage modulation is arranged around the center of the pixel and further from the center of the corresponding pixel (N is a natural number of 2 or more).

12 Claims, 23 Drawing Sheets

(51) Int. Cl.
*G09G 3/20* (2006.01)
*G09G 3/36* (2006.01)
*G02F 1/1339* (2006.01)
*G02F 1/1333* (2006.01)

(52) U.S. Cl.
CPC ......... *G09G 3/2074* (2013.01); *G09G 3/3659* (2013.01); *G02F 2001/133357* (2013.01); *G02F 2001/134345* (2013.01); *G09G 2300/0857* (2013.01)

(58) Field of Classification Search
CPC ...... G02F 2001/133357; G09G 3/2074; G09G 3/3659; G09G 2300/0857
USPC .......................................................... 349/114
See application file for complete search history.

(56) References Cited

U.S. PATENT DOCUMENTS

2010/0207852 A1  8/2010  Cok
2012/0154416 A1  6/2012  Nakanishi

FOREIGN PATENT DOCUMENTS

| | | |
|---|---|---|
| JP | 2002-328356 A | 11/2002 |
| JP | 2005-107494 | 4/2005 |
| JP | 2009-092945 A | 4/2009 |
| JP | 2012-133014 A | 7/2012 |
| JP | 2012-518199 A | 8/2012 |
| JP | 2012-145925 A | 12/2012 |
| TW | 2005-16294 | 5/2009 |
| TW | 2009-21632 A | 5/2009 |

OTHER PUBLICATIONS

Korean Office Action dated Nov. 29, 2014, for corresponding Korean Application No. 10-2012-0031593.
Taiwanese Office Action dated Aug. 13, 2015, for corresponding Taiwanese Application No. 103108010.
Japanese Office Action dated Jul. 28, 2015, for corresponding Japanese Application No. 2013-063107.

* cited by examiner 27B  27S 27B  27Sa

DISPLAY DEVICE AND ELECTRONIC APPARATUS

CROSS-REFERENCE TO RELATED APPLICATIONS

The present application is a Continuation of U.S. application Ser. No. 14/198,186 filed Mar. 5, 2014, and claims priority from Japanese Application No. 2013-063107, filed on Mar. 25, 2013, the contents of which are incorporated by reference herein in its entirety.

BACKGROUND

1. Technical Field

The present disclosure relates to a display device and an electronic apparatus including the same.

2. Description of the Related Art

In recent years, demand has been increasing for a display device for a mobile apparatus such as a cellular telephone or an electronic paper, or an on-vehicle display device. In some display devices, one pixel includes a plurality of sub-pixels, and the sub-pixels output light in different colors and are switched on and off to display various colors with one pixel. Examples of such a display device include, but are not limited to, a display device in which one pixel is divided into a plurality of display regions to express gradation by a combination of the display regions, which is area coverage modulation (for example, refer to Japanese Patent Application Laid-open Publication No. 05-181131).

The area coverage modulation requires division of pixels (sub-pixels for color display) into a plurality of pieces. Accordingly, an electrode included in the pixel is also divided and the number of coupling portions to a signal line increases according to the number of division. As a result, the display regions may reduce in a transmissive display device that performs display utilizing transmitted light of backlight from the back surface of a screen. In a reflective display device that performs display utilizing reflected light of external light and a transflective liquid crystal display device including a transmissive display region (transmissive display part) and a reflective display region (reflective display part) in one pixel, an area of the reflective display part that can be used for reflective display may reduce. When the area coverage modulation is performed, the gradation may not be sufficiently expressed depending on the arrangement of the divided regions.

For the foregoing reasons, there is a need for reducing effects on display quality caused by dividing the sub-pixel when the area coverage modulation is performed.

SUMMARY

According to an aspect, a display device includes a plurality of pixels each including a plurality of sub-pixels. Each of the sub-pixels is arranged around center of the corresponding pixel and divided into a plurality of display regions to perform N-bit area coverage modulation by a combination of the display regions. The display regions are arranged in such a manner that: a display region corresponding to a least significant bit of the area coverage modulation is arranged closest to the center of the corresponding pixel; and a display region corresponding to a higher significant bit of the area coverage modulation is arranged around the center of the pixel and further from the center of the corresponding pixel (N is a natural number of 2 or more).

According to an aspect, an electronic apparatus includes the display device.

DETAILED DESCRIPTION

Figure 1:
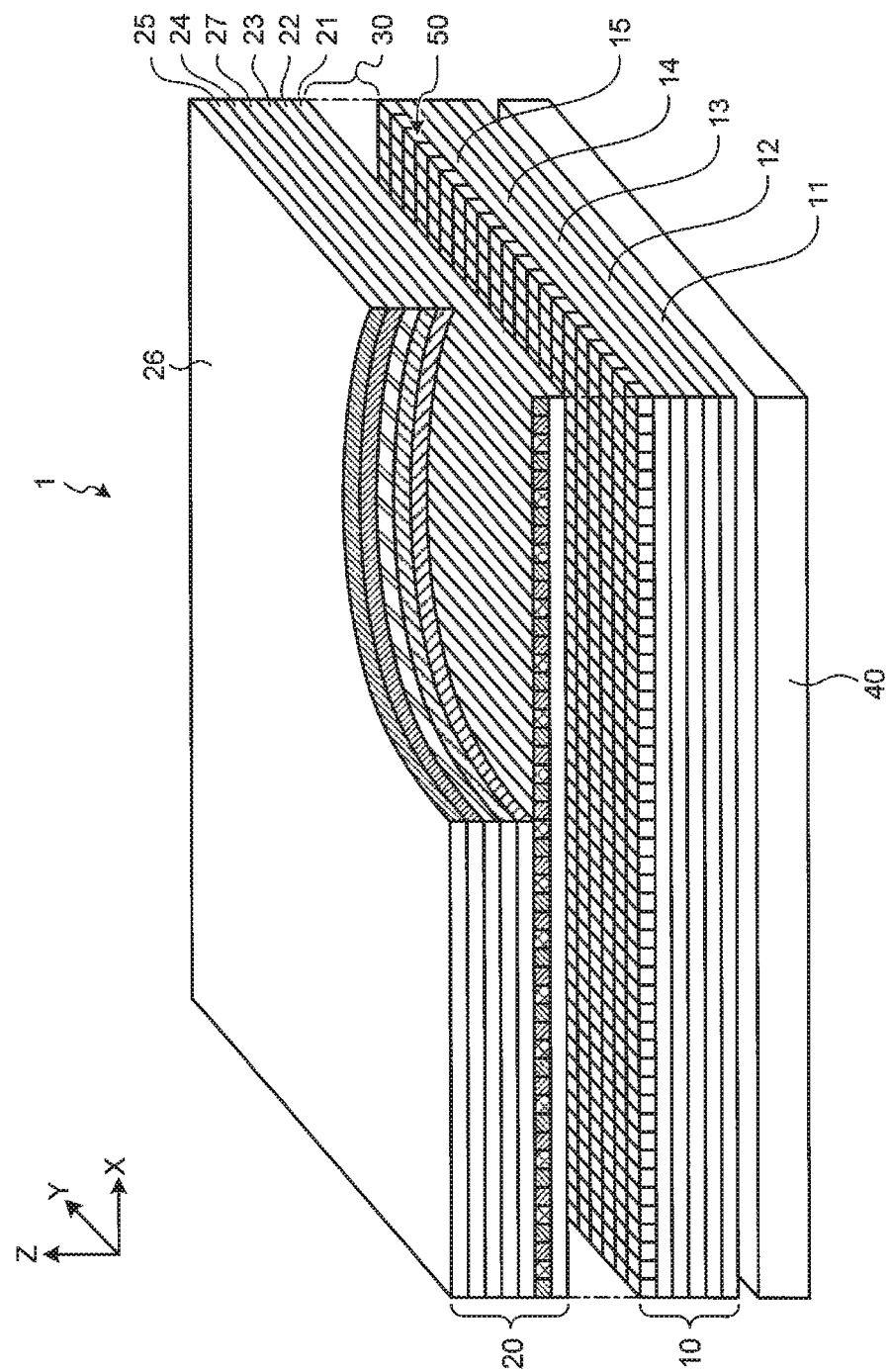
FIG. 1 is a partially cutout perspective view illustrating a schematic configuration of a transflective liquid crystal display device to which the present disclosure is applied.

The following describes modes for implementing the technique of the present disclosure (hereinafter, referred to as "embodiments") in detail with reference to the accompanying drawings in the following procedures.

1. Liquid crystal display device to which the present disclosure is applied
   1-1. Transflective liquid crystal display device for color display
   1-2. Example of pixel circuit
   1-3. Electrode structure of pixel part
   1-4. Scattering layer and spacer
   1-5. MIP technology
   1-6. Area coverage modulation
   1-7. First modification
   1-8. Second modification
2. Electronic apparatus
3. Configuration of present disclosure 1. Liquid Crystal Display Device to which the Present Disclosure is Applied The technique of the present disclosure can be applied to a flat panel (planar) display device. Examples of the flat panel display device include, but are not limited to, a display device using a liquid crystal display (LCD) panel, and a display device using an electro luminescence (EL) display panel.

The flat panel display devices can be classified into a transmissive type, a reflective type, and a transflective type according to a display type. The technique of the present disclosure can be applied to a transmissive liquid crystal display device, a reflective liquid crystal display device, and a transflective liquid crystal display device having characteristics of both the transmissive display device and the reflective display device. The liquid crystal display device according to the present disclosure is preferably used as a display unit of an electronic apparatus, especially as a portable electronic apparatus frequently used outdoors such as a portable information apparatus (a digital camera, for example) or a portable communication apparatus (a mobile phone, for example).

The liquid crystal display device to which the present disclosure is applied may be a display device for monochromatic display or a display device for color display. In the display device for color display, one pixel (unit pixel) as a unit forming a color image includes a plurality of sub-pixels. More specifically, in the display device for color display, for example, the unit pixel includes three sub-pixels of a sub-pixel representing red (R), a sub-pixel representing green (G), and a sub-pixel representing blue (B).

The pixel is not limited to a pixel including sub-pixels of the three primary colors (RGB). For example, the unit pixel may be made by adding sub-pixels of one color or a plurality of colors to the sub-pixels of the three primary colors (RGB). More specifically, for example, the unit pixel may be made by adding a sub-pixel representing white (W) for improving luminance, or the unit pixel may be made by adding at least one sub-pixel representing a complementary color to expand the range of color reproduction.

1-1. Transflective Liquid Crystal Display Device for Color Display

The following describes a transflective liquid crystal display device for color display as an example of the liquid crystal display device to which the present disclosure is applied with reference to the drawings. The present disclosure is not limited to color display. Not limited to the transflective liquid crystal display device, the present disclosure can be applied to a transmissive liquid crystal display device and a reflective liquid crystal display device.

FIG. 1 is a partially cutout perspective view illustrating a schematic configuration of a transflective liquid crystal display device to which the present disclosure is applied. As illustrated in FIG. 1, this transflective liquid crystal display device 1 as the liquid crystal display device to which the present disclosure is applied includes a first panel unit 10, a second panel unit 20, a liquid crystal layer 30, and a backlight unit 40, as main components. In the transflective liquid crystal display device 1, the surface side of the second panel unit 20 is a display surface side. The first panel unit 10 and the second panel unit 20 are arranged opposite to each other with a predetermined gap therebetween. The liquid crystal layer 30 is formed by filling liquid crystal material in the gap between the first panel unit 10 and the second panel unit 20.

The first panel unit 10 includes a polarizing plate 11, a ½ wavelength plate 12, a ¼ wavelength plate 13, a first substrate 14 formed of transparent glass or the like, and a planarization film 15 in this order on the side remote from the liquid crystal layer 30, that is, the backlight unit 40 side.

In the first panel unit 10, a plurality of signal lines and a plurality of scanning lines (both are not illustrated) are formed to intersect with each other on the first substrate 14. At parts where the signal lines and the scanning lines intersect with each other, the sub-pixels (hereinafter, simply referred to as "pixels" in some cases) 50 are two-dimensionally arranged in a matrix.

Circuit elements including a switch element such as a thin film transistor (TFT) and a capacitive element are also formed on the first substrate 14 for each pixel 50. The planarization film 15 is formed on the surface of the circuit element, the signal lines, and the scanning lines to flatten the surface of the first panel unit 10. Then a reflective electrode to be described later is formed on the planarization film 15 for each pixel 50. The first substrate 14 may be referred to as a TFT substrate because the circuit elements thus formed include the TFT.

The signal lines are wiring for transmitting a signal (display signal/video signal) that drives the pixel 50, and have a wiring structure extending along the arrangement direction of pixels of a pixel column, which is the column direction (Y-direction in FIG. 1), for each pixel column of the matrix of the pixels 50. The scanning lines are wiring for transmitting a signal (scanning signal) that selects the pixels 50 for each raw, and have a wiring structure extending along the arrangement direction of pixels of a pixel row, which is the row direction (X-direction in FIG. 1), for each pixel row of the matrix of the pixels 50. The X-direction and the Y-direction are orthogonal to each other.

The second panel unit 20 includes a transparent electrode 21 formed of indium tin oxide (ITO) or the like, a color filter 22, a second substrate 23 formed of transparent glass or the like, a scattering layer 27, a ¼ wavelength plate 24, a ½ wavelength plate 25, and a polarizing plate 26 arranged in this order from the liquid crystal layer 30 side.

In the second panel unit 20, the color filter 22 has a configuration in which respective stripe-shaped filters of R (red), G (green), and B (blue) extending in the column direction (Y-direction) for example are repeatedly arranged at a pitch same as the pitch of the pixel 50 in the row direction (X-direction). The second substrate 23 may be referred to as a CF substrate because it includes the color filter (CF) 22.

A transflective liquid crystal display panel includes the first panel unit 10, the second panel unit 20 opposed to the first panel unit 10, and the liquid crystal layer 30 arranged between the first panel unit 10 and the second panel unit 20. The upper surface (front surface) of the second panel unit 20 is a display surface.

The backlight unit 40 is an illumination unit that illuminates the liquid crystal display panel from the back surface side thereof, that is, the side opposed to the liquid crystal layer 30 of the first panel unit 10. The backlight consists of well-known members such as a light emitting diode (LED) or a fluorescent tube as a light source, and a well-known member such as a prism sheet, a diffusion sheet, and a light-guiding plate. However, the members for the back light are not limited to them.

In the transflective liquid crystal display device 1 having the above structure, each of the pixels 50 includes a reflective display region (reflective display part) and a transmissive display region (transmissive display part). As described above, the reflective display region includes the reflective electrode formed for each pixel 50 on the surface of the planarization film 15. The reflective electrode reflects external light incident from the outside through the second panel unit 20 to be used for display. The transmissive display region transmits light from the backlight unit 40 and performs display using the transmitted light. Details of the transmissive display region provided for each pixel 50 will be described later.

1-2. Example of Pixel Circuit

An example of the pixel circuit of the pixel 50 will be described with reference to FIG. 2. The direction indicated by "X" in FIG. 2 (X-direction) indicates the row direction of the transflective liquid crystal display device 1 illustrated in FIG. 1, and the direction indicated by "Y" (Y-direction) in FIG. 2 indicates the column direction in FIG. 1.

Figure 2:
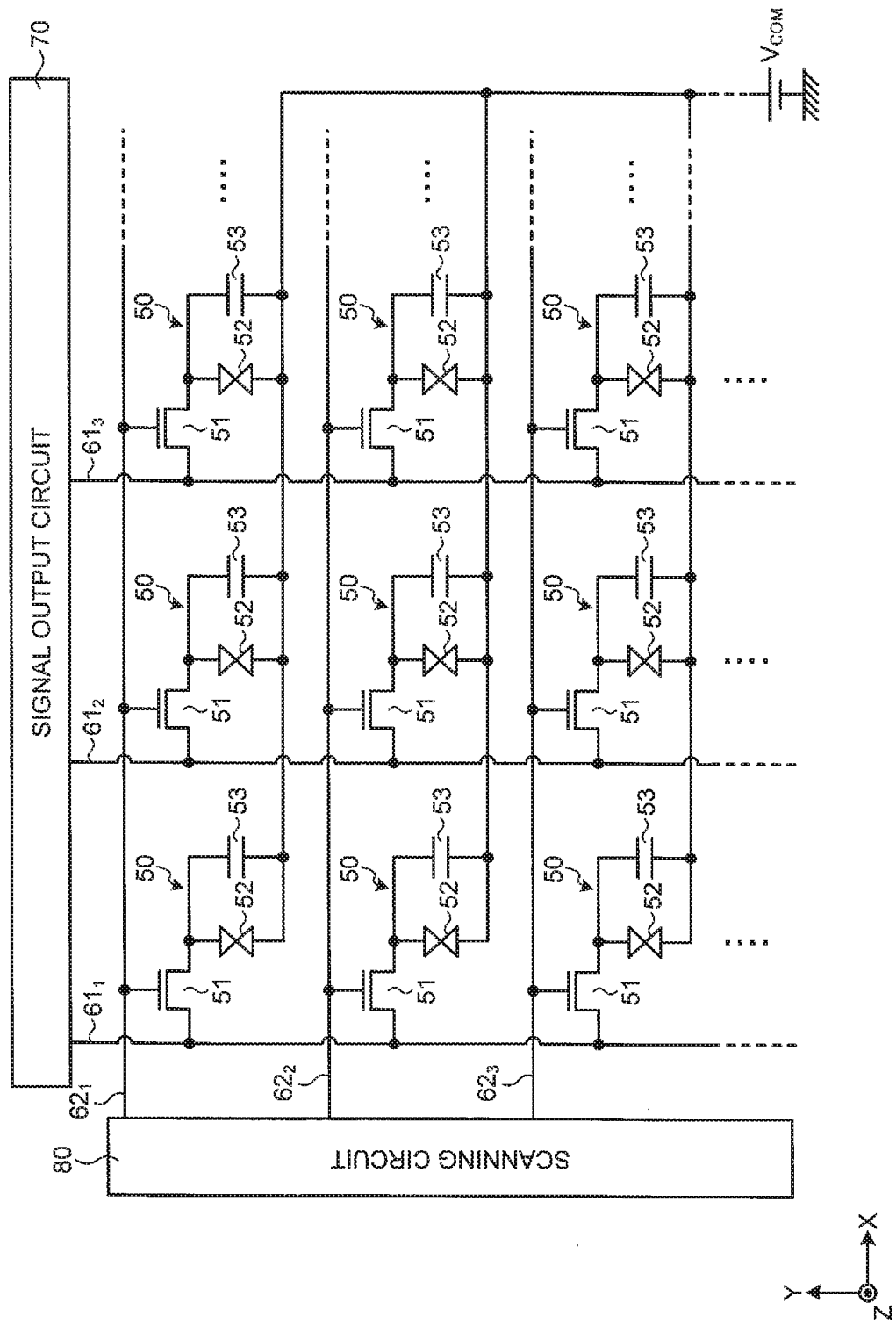
FIG. 2 is a diagram illustrating an example of a pixel circuit.

FIG. 2 is a diagram illustrating an example of a pixel circuit. As illustrated in FIG. 2, a plurality of signal lines 61 ($61_1$, $61_2$, $61_3$, . . . ) are arranged orthogonally to a plurality of scanning lines 62 ($62_1$, $62_2$, $62_3$, . . . ), and the pixels 50 are arranged at intersection parts thereof. The scanning lines 62 ($62_1$, $62_2$, $62_3$, . . . ) extend in the row direction (X-direction), and the signal lines 61 ($61_1$, $61_2$, $61_3$, . . . ) extend in the column direction (Y-direction). As described above, the signal lines 61 and the scanning lines 62 are formed on a surface of the first substrate (TFT substrate) 14 of the first panel unit 10. One end of each of the signal lines 61 ($61_1$, $61_2$, $61_3$, . . . ) is coupled to a corresponding output of a signal output circuit 70, and one end of each of the scanning lines 62 ($62_1$, $62_2$, $62_3$, . . . ) is coupled to a corresponding output of a scanning circuit 80.

For example, the pixel 50 includes a pixel transistor 51 employing a thin film transistor (TFT), a liquid crystal capacitor 52, and a holding capacitor 53. The gate electrode of the pixel transistor 51 is coupled to the scanning line 62 ($62_1$, $62_2$, $62_3$, . . . ), and the source electrode of the pixel transistor 51 is coupled to the signal line 61 ($61_1$, $61_2$, $61_3$, . . . ).

The liquid crystal capacitor 52 means a capacitive component of liquid crystal material generated between a pixel electrode and a counter electrode formed opposite thereto (corresponding to the transparent electrode 21 in FIG. 1), and the pixel electrode is coupled to the drain electrode of the pixel transistor 51. In color display, the pixel electrode corresponds to the reflective electrode formed for each sub-pixel, whereas in monochromatic display, the pixel electrode corresponds to the reflective electrode formed for each pixel. The direct current voltage at a common potential $V_{COM}$ is applied to the counter electrode of the liquid crystal capacitor 52 in each of the pixels. One electrode of the holding capacitor 53 is coupled to the pixel electrode of the liquid crystal capacitor 52, and the other electrode of the holding capacitor 53 is coupled to the counter electrode of the liquid crystal capacitor 52.

As is clear from the pixel circuit described above, the signal lines 61 ($61_1$, $61_2$, $61_3$, . . . ) are wiring that transmits a signal for driving the pixel 50, which is a video signal output from the signal output circuit 70, to the pixels 50 in each pixel column. The scanning lines 62 ($62_1$, $62_2$, $62_3$, . . . ) are wiring that transmits a signal for selecting the pixels 50 for each row, which is the scanning signal output from the scanning circuit 80 for each pixel row.

1-3. Electrode Structure of Pixel Part

Figure 3:
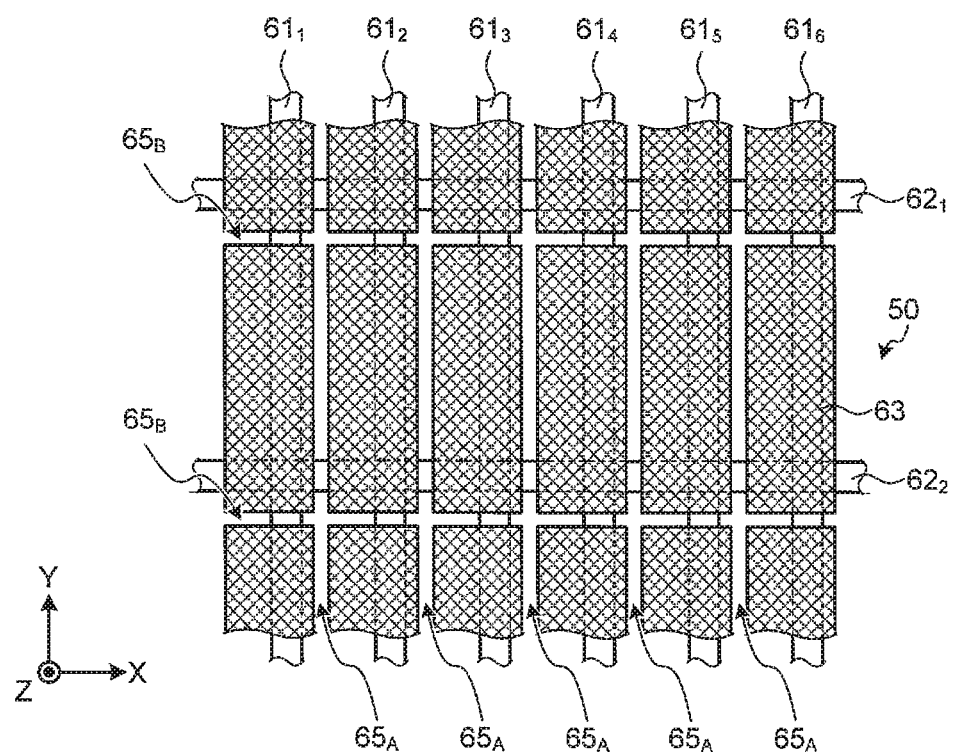
FIG. 3 is a plan view illustrating the electrode structure of a pixel part according to an embodiment.

FIG. 3 is a plan view illustrating the electrode structure of a pixel part according to an embodiment. The transflective liquid crystal display device 1 performs transmissive display using a space between the pixels 50 of a reflective electrode 63 while maintaining reflection display performance equivalent to that of the reflective display device. Specifically, as illustrated in FIG. 3, the wiring of signal lines 61, scanning lines 62, and the like is formed so as not to block the space between the pixels 50 of the reflective electrode 63 in the pixel part in which the pixels 50 are arranged in a matrix. Accordingly, the transmissive display can be performed using the space as the transmissive display region.

In FIG. 3, the reflective electrode 63 is illustrated by hatching. The space between the pixels 50 of the reflective electrode 63 includes a space $65_A$ extending along the arrangement direction of the pixels of the pixel column, which is the column direction (Y-direction illustrated in FIG. 3), and a space $65_B$ extending along the arrangement direction of the pixels of the pixel row, which is the row direction (X-direction illustrated in FIG. 3). The present example illustrates the signal line 61 and the scanning line 62 as the wiring formed in the pixel part. However, the wiring formed in the pixel part is not limited thereto. That is, all driving lines (control lines) required for driving (controlling) the pixel 50 are the wiring according to the example.

The phrase "not to block the space" does not exclude a case in which there is a region where the wiring overlaps with the spaces $65_A$ and $65_B$ between the pixels 50 of the reflective electrode 63. Specifically, the concept of "not to block the space" includes a state in which the signal line 61 wired in the column direction overlaps with the space $65_B$ extending in the row direction, and a state in which the scanning line 62 wired in the row direction overlaps with the space $65_A$ extending in the column direction.

The concept of "not to block the space" also includes a state in which the signal line 61 partly or partially overlaps with the space $65_A$ extending in the column direction, and a state in which the scanning line 62 partly or partially overlaps with the space $65_B$ extending in the row direction.

In both cases, a region where the signal line 61 and the scanning line 62 do not overlap with the spaces $65_A$ and $65_B$, respectively, is used as the transmissive display region.

Not to block the spaces $65_A$ and $65_B$ between the pixels 50 of the reflective electrode 63, the wiring is preferably formed away from the spaces $65_A$ and $65_B$ between the pixels 50 of the reflective electrode 63. The phrase "away from the spaces" means a state in which wiring does not entirely cover the spaces $65_A$ and $65_B$ between the pixels 50 of the reflective electrode 63 (that is, there is no region where the wiring entirely overlaps with the spaces $65_A$ and $65_B$).

Specifically, as illustrated in FIG. 3, the signal line 61 is preferably wired away from the space $65_A$ extending in the column direction, that is, having no region (portion) entirely overlapping with the space $65_A$. The scanning line 62 is preferably wired away from the space $65_B$ extending in the row direction, that is, having no region entirely overlapping with the space $65_B$. The entire regions of the spaces $65_A$ and $65_B$ can be used as the transmissive display region because there is no region overlapping with the signal line 61 and the scanning line 62 in the spaces $65_A$ and $65_B$ between the pixels 50 of the reflective electrode 63, so that the transflective liquid crystal display device 1 can obtain higher transmissive display performance.

As described above, the transflective liquid crystal display device 1 performs transmissive display using the space between the pixels 50 of the reflective electrode 63, that is, the space is used as the transmissive display region. Accordingly, it is not necessary to separately secure the transmissive display region in the pixel 50. In this way, as is clear from FIG. 3, the dimensions of individual pieces of the reflective electrode 63 are equivalent to the dimensions of those of the reflective liquid crystal display device when the pixels 50 have the same size in the transflective liquid crystal display device 1. As a result, the transflective liquid crystal display device 1 can achieve transmissive display while maintaining the reflection display performance equivalent to that of the reflective display device.

1-4. Scattering Layer and Spacer

Figure 4:
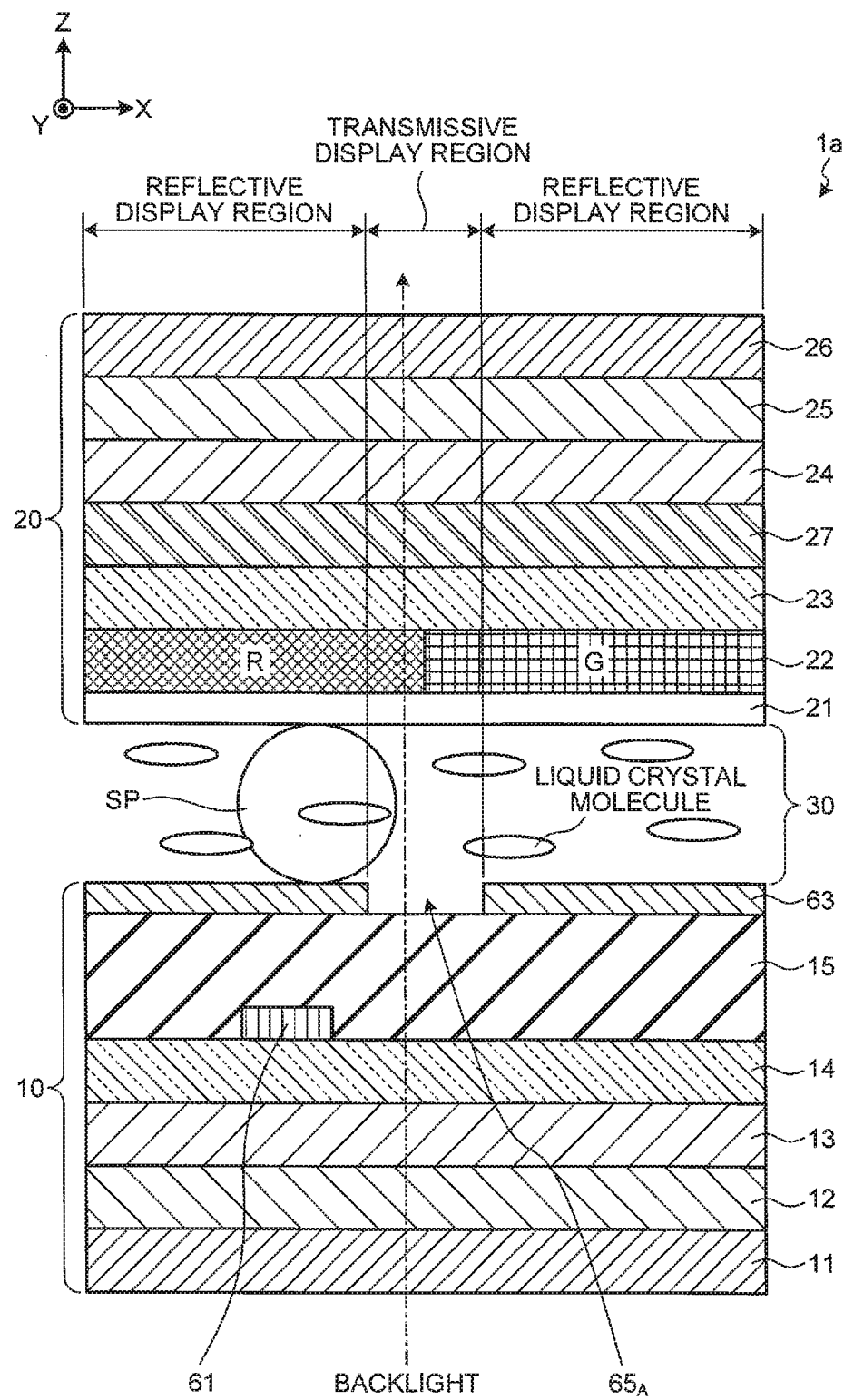
FIG. 4 is a cross-sectional view illustrating a transflective liquid crystal display device to which the present disclosure is applied.

FIG. 4 is a cross-sectional view illustrating the transflective liquid crystal display device to which the present disclosure is applied. As illustrated in FIG. 4, the scattering layer 27, the ¼ wavelength plate 24 as a wave plate, the ½ wavelength plate 25 as a wave plate, and the polarizing plate 26 are arranged in this order on the opposite side of the second substrate 23 to the color filter 22. The scattering layer 27 is provided in the traveling direction of light reflected by the reflective electrode 63. The scattering layer 27 is an anisotropic or isotropic layer that scatters light reflected by the reflective electrode 63 and backlight transmitted through the space $65_A$ between the pixels. The scattering layer 27 includes two light scattering films 271. The two light scattering films 271 are laminated in a direction away from the second substrate 23. The light scattering film 271 may have one layer or three or more layers. It is preferable that the light scattering film 271 has a plurality of layers because the diffusion range of light can be expanded and iridescence can be more securely reduced.

As illustrated in FIG. 4, a spacer SP is provided between the transparent electrode 21 and the reflective electrode 63. The spacer SP keeps a constant interval between the transparent electrode 21 and the reflective electrode 63, and forms a space in which the liquid crystal layer 30 is provided therebetween. The liquid crystal layer 30 is formed of liquid crystal molecules provided between the transparent electrode 21 and the reflective electrode 63.

Figure 5:
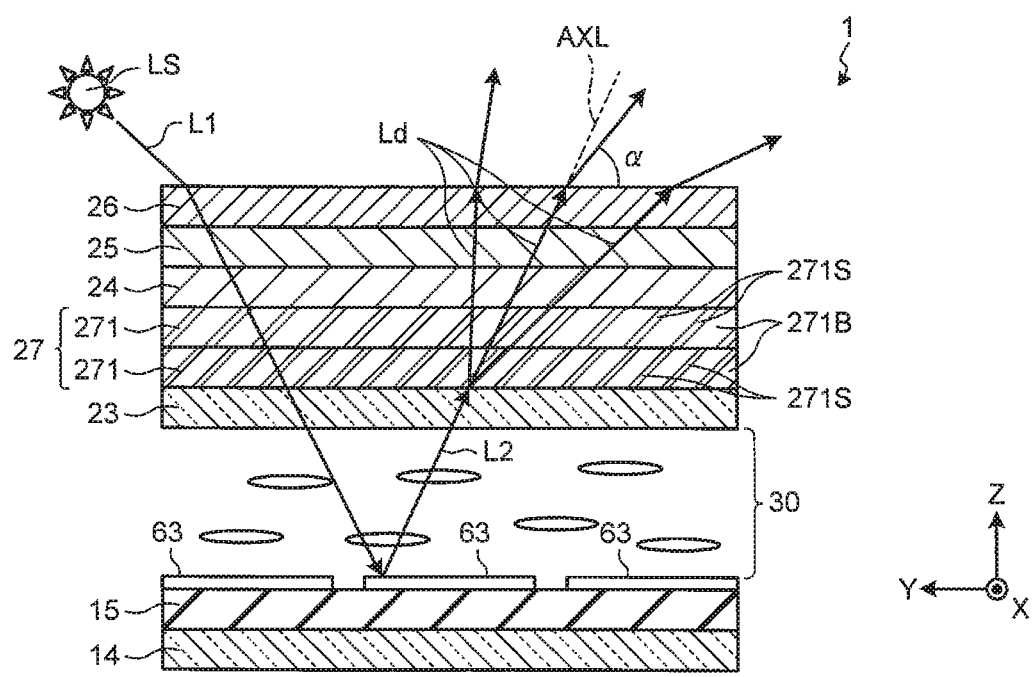
FIG. 5 is a cross-sectional view illustrating an example of a light scattering film.
Figure 6:
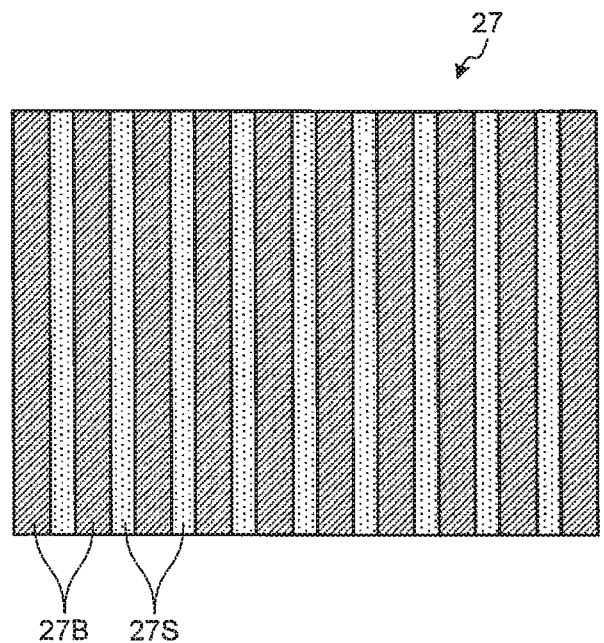
FIG. 6 is a plan view illustrating the example of the light scattering film.
Figure 7:
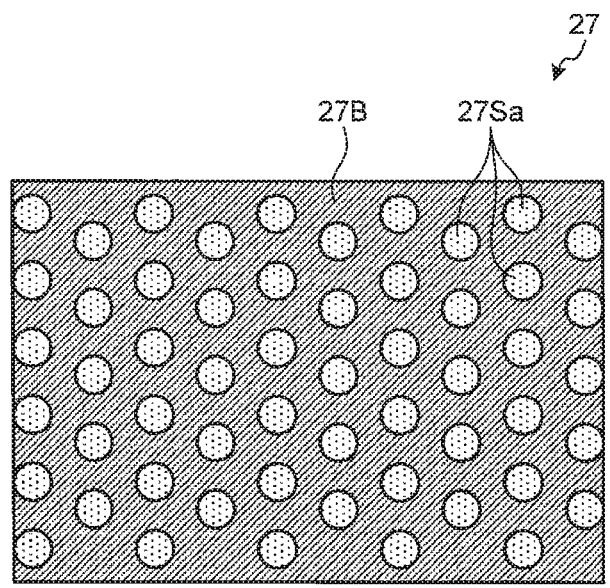
FIG. 7 is a plan view illustrating a modification of the light scattering film.

FIG. 5 is a cross-sectional view illustrating an example of the light scattering film, FIG. 6 is a plan view illustrating the example of the light scattering film, and FIG. 7 is a plan view illustrating a modification of the light scattering film. For example, a light control film (LCF) may be used as the light scattering film 271. The light scattering film 271 is a forward scattering layer that largely scatters light forward and scarcely scatters light backward. The light scattering film 271 is an anisotropic scattering film that scatters light incident from a specific direction. When light is incident from a specific direction on the polarizing plate 26 side with respect to the second substrate 23, the light scattering film 271 transmits the incident light almost without scattering, and largely scatters the returned light reflected by the reflective electrode 63.

For example, as illustrated in FIG. 5, the light scattering film 271 transmits external light L1 incident from a light emitting body LS (for example, illumination or the sun) in a predetermined direction with respect to the second substrate 23, and scatters light L2 thus transmitted and reflected by the reflective electrode 63 (reflected light) within a predetermined range around a scattering center axis AXL. The external light L1 is parallel light incident on the polarizing plate 26 of the second substrate 23. The external light L1 may be unpolarized light or polarized light. For example, as illustrated in FIG. 6, the light scattering film 271 includes two types of regions (a first region 27B and a second region 27S) having different refractive indexes. The light scattering film 271 may have a louver structure in which a plurality of plate-shaped second regions 27S are arranged at predetermined intervals in the first region 27B as illustrated in FIG. 6, or may have a pillar-shaped structure in which pillar-shaped second regions 27Sa are arranged in the first region 27B like a light scattering film 271a illustrated in FIG. 7.

For example, in the light scattering film 271, the first region 27B and the second region 27S extend in the thickness direction and incline in a predetermined direction. For example, the light scattering film 271 is formed by obliquely irradiating a resin sheet with ultraviolet rays, the resin sheet being a composite of two or more types of photopolymerizable monomer or oligomer of which refractive indexes are different from each other. The light scattering film 271 may have a different structure from the above, and may be manufactured in a method different from the above. In a case in which the scattering layer 27 includes the light scattering films 271, the light scattering films 271 may have the same structure or may have different structures from each other.

The scattering center axis AXL of the light scattering film 271 is preferably oriented, for example, toward the direction of a main visual angle α (main visual angle direction) of the transflective liquid crystal display device 1 illustrated in FIG. 1. The scattering center axis AXL may be oriented toward a direction different from the main visual angle direction. In both cases, the orientation of the scattering center axis AXL may be set so that luminance in the main visual angle direction is the brightest, that is, the reflectivity in the direction is the highest due to the light scattering film 271, when the light scattering film 271 is used. The main visual angle α corresponds to a direction from which a user of the transflective liquid crystal display device 1 views a video display surface when using the transflective liquid crystal display device 1. For example, when the video display surface has a rectangular shape, the main visual angle direction corresponds to a direction orthogonal to a side closest to the user among the sides of the video display surface.

When the backlight or the like is transmitted through the space $65_A$ between the pixels, a variation in the transmission of the backlight or the like may increase due to the patterning accuracy of the reflective electrode 63 or misalignment with respect to the second substrate 23. Especially, when silver is used for the reflective electrode 63 through a wet process, the variation described above may significantly increase. When the scattering layer 27 including the light scattering film 271 is used, the transmitted light is scattered, so that it is advantageous that the variation described above is leveled.

1-5. MIP Technology

To perform transmissive display using a space between the pixels 50 of the reflective electrode 63, a frame inversion driving method is preferably used rather than a line inversion driving method or a dot inversion driving method. Employment of the line inversion driving method or the dot inversion driving method is not excluded. In the frame inversion driving method, shading may occur because a signal voltage of the same polarity is written to the signal line over one frame period. In the frame inversion driving method, the transflective liquid crystal display device 1 employs a pixel having a memory function as the pixel 50. This is called the MIP (Memory In Pixel) technology, in which each pixel has a memory capable of storing therein data. In the MIP technology, shading can be reduced because a constant voltage is always applied to the pixel 50.

In the MIP technology, the pixel includes a memory that stores therein data, achieving display in an analog display mode and display in a memory display mode. The analog display mode is a display mode to analogically display the gradation of the pixel. The memory display mode is a display mode to digitally display the gradation of the pixel based on binary information (logical "1"/logical "0") stored in the memory in the pixel.

The information held in the memory is used in the memory display mode, eliminating the need to perform a writing operation of a signal potential reflecting the gradation in a frame cycle. Accordingly, power consumption in the memory display mode is lower than that in the analog display mode in which the writing operation of the signal potential reflecting the gradation is performed in a frame cycle. In other words, the power consumption in the transflective liquid crystal display device 1 can be reduced.

Figure 8:
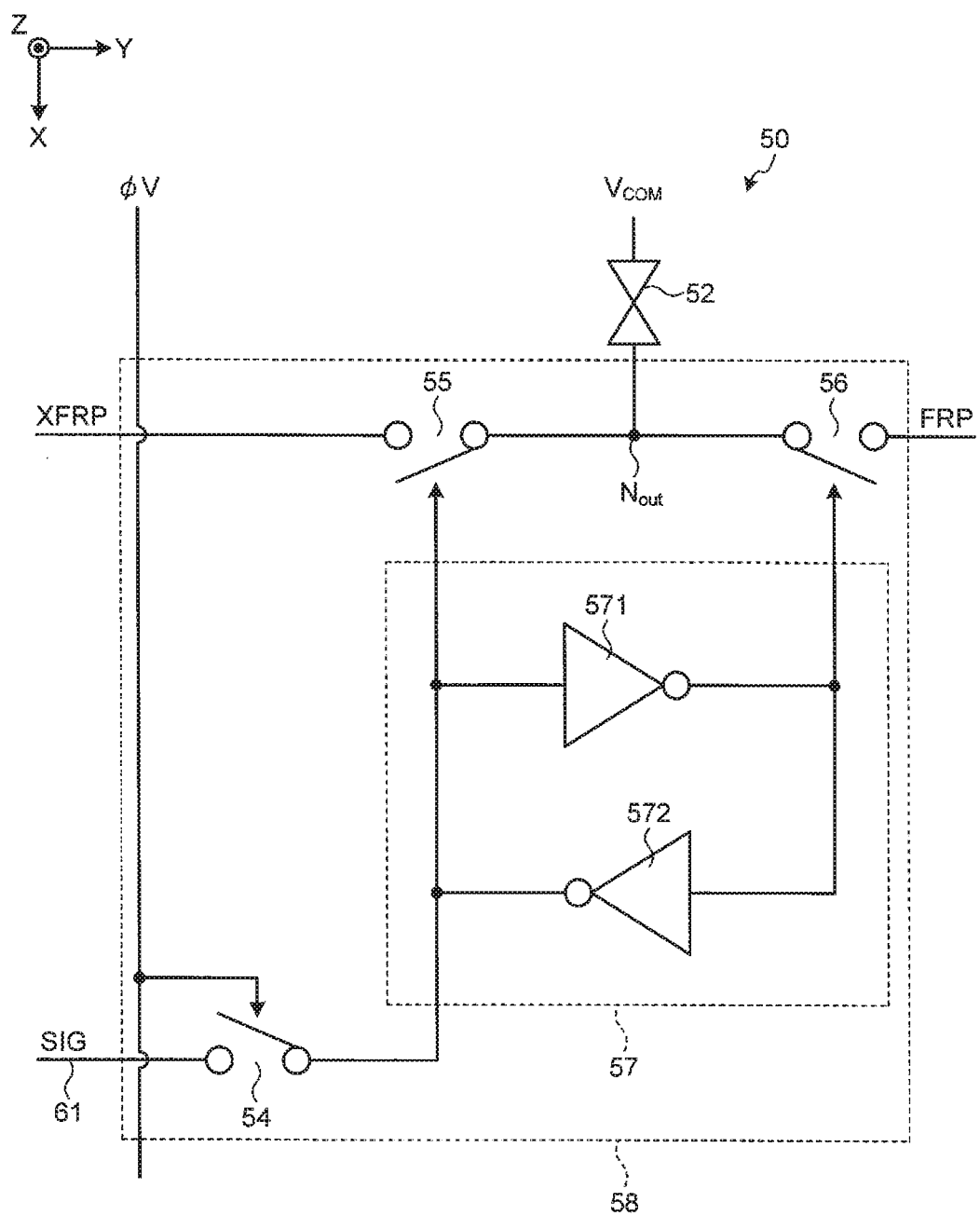
FIG. 8 is a block diagram illustrating an example of a circuit configuration of a pixel employing the MIP technology.
Figure 9:
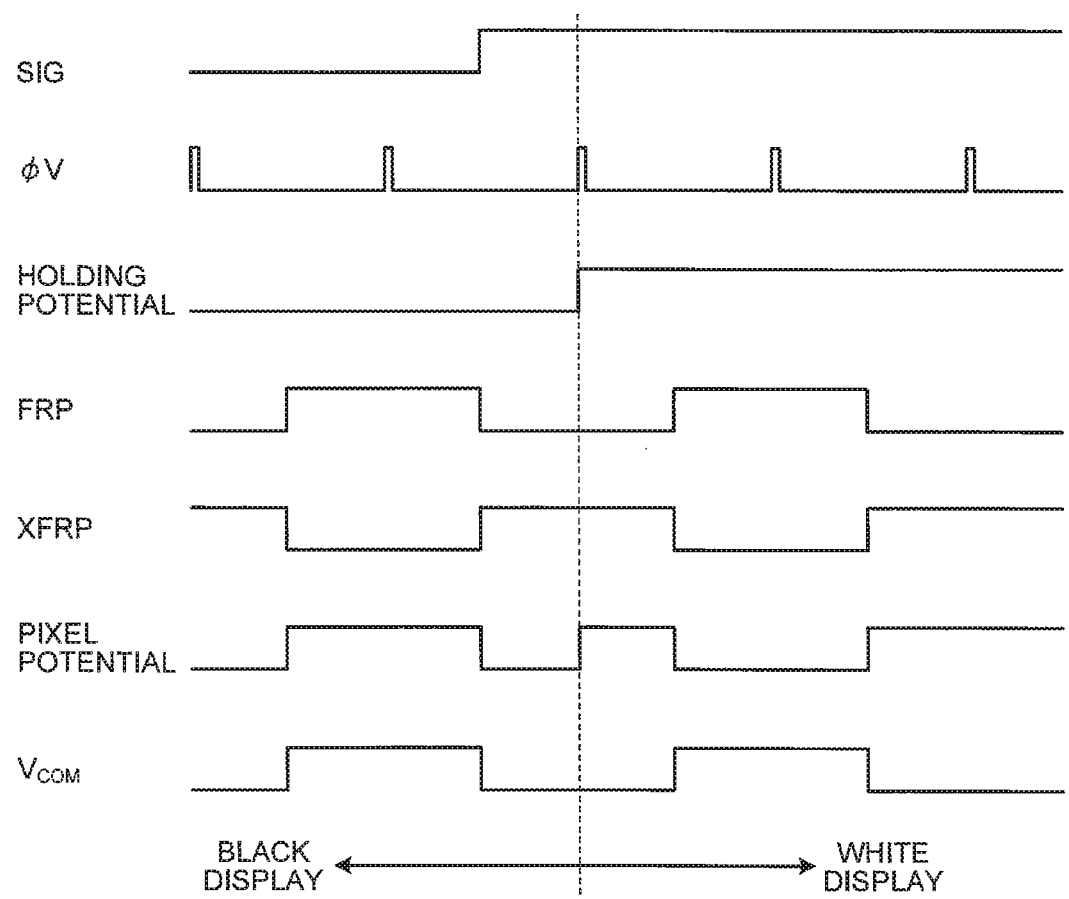
FIG. 9 is a timing chart illustrating an operation of the pixel employing the MIP technology.

FIG. 8 is a block diagram illustrating an example of a circuit configuration of the pixel employing the MIP technology, where the same components as those in FIG. 2 are denoted by the same reference numerals. FIG. 9 is a timing chart illustrating an operation of the pixel employing the MIP technology.

As illustrated in FIG. 8, the pixel 50 includes a drive circuit unit 58 including three switch elements 54, 55, and 56 and a latch unit 57, in addition to the liquid crystal capacitor (liquid crystal cell) 52. The drive circuit unit 58 includes a static random access memory (SRAM) function. The pixel 50 including the drive circuit unit 58 has a pixel configuration with the SRAM function. The liquid crystal capacitor (liquid crystal cell) 52 means a liquid crystal capacitor generated between the pixel electrode (for example, the reflective electrode 63 in FIG. 3) and the counter electrode opposed thereto.

One end of the switch element 54 is coupled to the signal line 61 (corresponding to the signal lines $61_1$ to $61_3$ in FIG. 2). The switch element 54 is switched to an "ON" (closed) state when a scanning signal ϕV is given from the scanning circuit 80 in FIG. 2, and captures data SIG supplied from the signal output circuit 70 in FIG. 2 via the signal line 61. The latch unit 57 includes inverters 571 and 572 that are coupled in parallel in mutually opposite directions. The latch unit 57 holds (latches) an electric potential corresponding to the data SIG captured by the switch element 54.

A control pulse XFRP having the opposite phase to the common potential $V_{COM}$ and a control pulse FRP having the same phase as the common potential $V_{COM}$ are given to one terminal of each of the switch elements 55 and 56. The other terminal of each of the switch elements 55 and 56 is coupled in common, and this common connection node $N_{out}$ is an output node $N_{out}$ of the pixel circuit. Any one of the switch elements 55 and 56 is switched to the "ON" state depending on the polarity of the holding potential of the latch unit 57. Accordingly, the control pulse FRP or the control pulse XFRP is applied to the pixel electrode (for example, the reflective electrode 63 in FIG. 3) of the liquid crystal capacitor 52 in which the common potential $V_{COM}$ is applied to the counter electrode (the transparent electrode 21 in FIG. 1).

As is clear from FIG. 9, when the holding potential of the latch unit 57 has a negative polarity in this example, the pixel potential of the liquid crystal capacitor 52 has the same phase as the common potential $V_{COM}$, so that black is displayed. When the holding potential of the latch unit 57 has a positive polarity, the pixel potential of the liquid crystal capacitor 52 has the opposite phase to the common potential $V_{COM}$, so that white is displayed.

As is clear from the above description, in the pixel 50 using the MIP technology, when any one of the switch elements 55 and 56 is switched to the "ON" state depending on the polarity of the holding potential of the latch unit 57, the control pulse FRP or the control pulse XFRP is applied to the pixel electrode (for example, the reflective electrode 63 in FIG. 3) of the liquid crystal capacitor 52. As a result, a constant voltage is always applied to the pixel 50, reducing the shading.

The present example describes using the SRAM as a memory incorporated in the pixel 50. However, the SRAM is an example, and other memory such as a dynamic random access memory (DRAM) may be used.

1-6. Area Coverage Modulation

The area coverage modulation method is employed for reducing unevenness in the display quality due to variation in TFT characteristics, for example. In the MIP technology, only two gradations are expressed with 1 bit for each pixel 50. When the transflective liquid crystal display device 1 employs the MIP technology, the area coverage modulation method may be preferably used. The area coverage modulation method is a gradation expression method of expressing four gradations with 2 bits by weighting a pixel area (the area of the pixel electrode) by 2:1, for example.

Specifically, the area coverage modulation method is used for dividing the reflective electrode 63 (refer to FIG. 3) as a reflective display region of the pixel (sub-pixel) 50 into a plurality of electrodes that are areally weighted. The pixel potential selected by the holding potential of the latch unit 57 is applied to the divided pixel electrode that is areally weighted to perform gradation display by a combination of weighted areas. Hereinafter, display regions obtained by areally weighting and dividing the sub-pixel 50 are referred to as "divided pixels". The reflective electrode 63 illustrated in FIG. 3 corresponds to the sub-pixel 50 illustrated in FIG. 1. Electrodes obtained by areally weighting and dividing the reflective electrode 63 are referred to as "divided pixel electrodes."

The area coverage modulation method will be specifically described below. The area coverage modulation method is a gradation expression method in which 2×N gradations are expressed with N electrodes weighted in such an area ratio that their areas are proportionally $2^0, 2^1, 2^2, \ldots, 2^{N-1}$ (where one electrode corresponds to a bit for displaying the gradation). When a plurality of electrodes correspond to the bit for displaying the gradation, in the area coverage modulation method, the electrodes corresponding to the bit are weighted in such an area ratio that their areas are proportionally $2^0, 2^1, 2^2, \ldots, 2^{N-1}$, thereby displaying $2^N$ gradation with N bits (N is a natural number of 2 or more).

Figure 10:
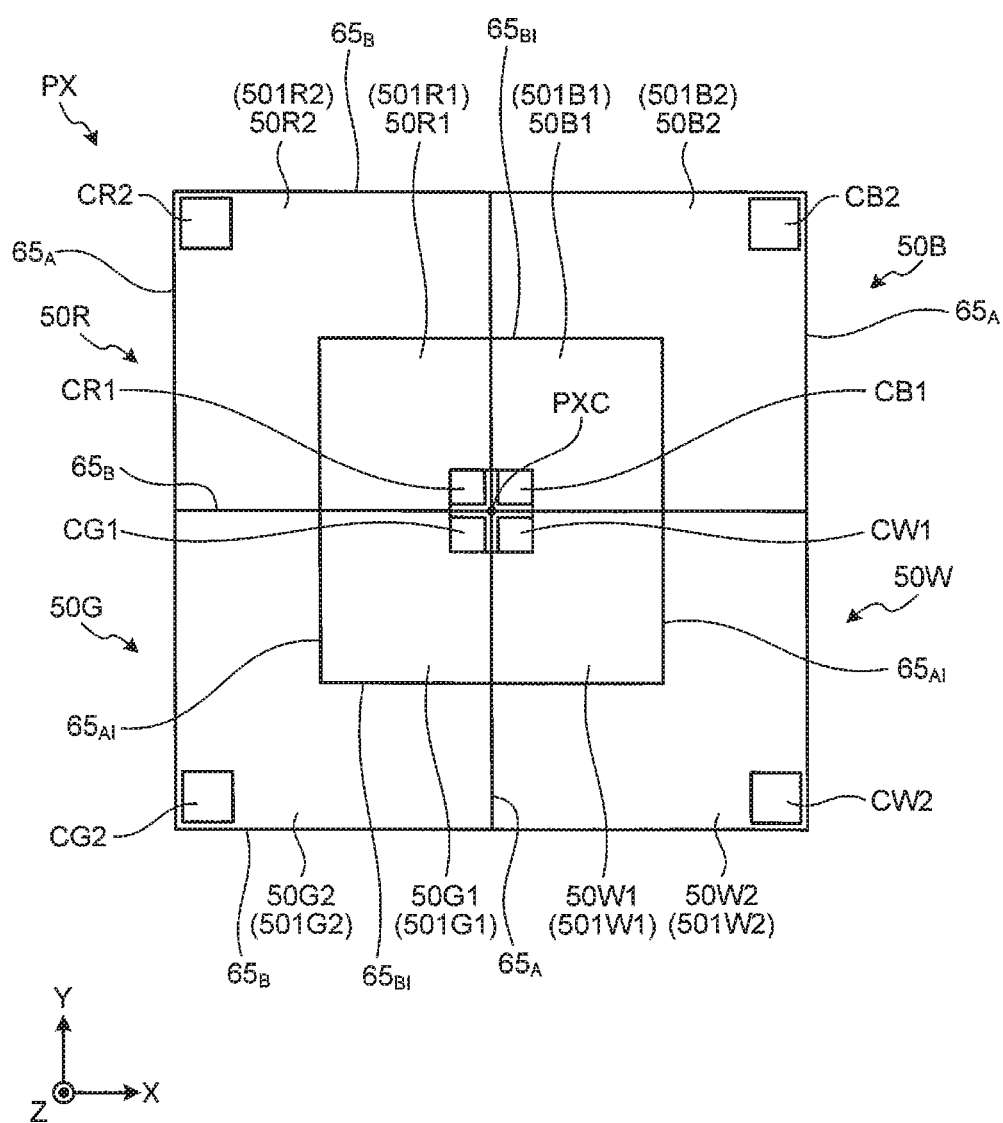
FIG. 10 is a diagram illustrating a pixel of the transflective liquid crystal display device according to the present embodiment.

FIG. 10 is a diagram illustrating a pixel of the transflective liquid crystal display device according to the present embodiment. A pixel PX includes sub-pixels 50B, 50R, 50G, and 50W. The sub-pixel 50B represents blue, the sub-pixel 50R represents red, the sub-pixel 50G represents green, and the sub-pixel 50W represents white.

The sub-pixel 50B includes a first divided pixel 50B1 and a second divided pixel 50B2. The sub-pixel 50R includes a first divided pixel 50R1 and a second divided pixel 50R2. The sub-pixel 50G includes a first divided pixel 50G1 and a second divided pixel 50G2. The sub-pixel 50W includes a first divided pixel 50W1 and a second divided pixel 50W2. In the present embodiment, the area ratio between the first divided pixel 50B1 and the second divided pixel 50B2 is 1:2, the area ratio between the first divided pixel 50R1 and the second divided pixel 50R2 is 1:2, the area ratio between the first divided pixel 50G1 and the second divided pixel 50G2 is 1:2, and the area ratio between the first divided pixel 50W1 and the second divided pixel 50W2 is 1:2. These area ratios are not limited to 1:2, and may be changed as appropriate according to the specifications of the transflective liquid crystal display device 1 or the characteristics of the color filter 22, and the like.

The sub-pixels 50B, 50R, 50G, and 50W included in the pixel PX are arranged around the center PXC of the pixel PX. The sub-pixels 50B, 50R, 50G, and 50W are divided into a plurality of display regions, that is, the first divided pixels 50B1, 50R1, 50G1, and 50W1 and the second divided pixels 50B2, 50R2, 50G2, and 50W2, respectively. The respective sub-pixels 50B, 50R, 50G, and 50W can achieve N-bit area coverage modulation by a combination of the first divided pixels 50B1, 50R1, 50G1, and 50W1 and the second divided pixels 50B2, 50R2, 50G2, and 50W2.

The first divided pixels 50B1, 50R1, 50G1, and 50W1 are display regions corresponding to the least significant bit in the N-bit (in this embodiment, N=2 bits) area coverage modulation. The second divided pixels 50B2, 50R2, 50G2, and 50W2 are display regions corresponding to the most significant bit in the N-bit (in this embodiment, N=2 bits) area coverage modulation. The first divided pixels 50B1, 50R1, 50G1, and 50W1 include divided electrodes 501B1, 501R1, 501G1, and 501W1 as reflective electrodes, respectively. The first divided pixels 50B1, 50R1, 50G1, and 50W1 include divided electrodes 501B2, 501R2, 501G2, and 501W2 as reflective electrodes, respectively.

The display regions corresponding to the least significant bit, that is, the first divided pixels 50B1, 50R1, 50G1, and 50W1 are arranged closest to the center PXC of the pixel PX. The display regions corresponding to a higher significant bit of the area coverage modulation, that is, the second divided pixels 50B2, 50R2, 50G2, and 50W2 are arranged away from the center PXC of the pixel PX.

The center PXC of the pixel PX is the centroid of the pixel PX in a plan view in which the pixel PX is viewed from the direction orthogonal to the display surface of the transflective liquid crystal display device 1. The pixel PX has a square shape in the plan view, and the intersection point of diagonal lines thereof is the center PXC of the pixel PX.

The sub-pixels 50B, 50R, 50G, and 50W are partitioned by a space $65_A$ extending in the column direction (Y-direction) and a space $65_B$ extending in the row direction (X-direction). The first divided pixels 50B1, 50R1, 50G1, and 50W1 and the second divided pixels 50B2, 50R2, 50G2, and 50W2 are partitioned by a space $65_{AI}$ extending in the column direction (Y-direction) and a space $65_{BI}$ extending in the row direction (X-direction), respectively.

The space $65_{AI}$ and the space $65_{BI}$ do not contribute to reflective display with the divided electrodes 501B1, 501R1, 501G1, and 501W1 and the divided electrodes 501B2, 501R2, 501G2, and 501W2 as reflective electrodes. Smaller areas of the space $65_{AI}$ and the space $65_{BI}$ lead to an increase in the effective reflection area ratio, that is, an area ratio between the reflective electrode and the space $65_{AI}$ and the space $65_{BI}$ in one pixel PX. As a result, in the reflective liquid crystal display device and the transflective liquid crystal display device 1, it is possible to minimize influence on the display quality (deterioration in the display quality) in the reflective display due to the division of the sub-pixels 50B, 50R, 50G, and 50W.

In the case of a transmissive liquid crystal display device, smaller areas of the space $65_{AI}$ and the space $65_{BI}$ lead to larger areas of the first divided pixels 50B1, 50R1, 50G1, and 50W1 and the second divided pixels 50B2, 50R2, 50G2, and 50W2 with respect to the sub-pixels 50B, 50R, 50G, and 50W, respectively. As a result, it is possible to suppress reduction of the display region caused by dividing the sub-pixel 50, so that it is possible to minimize the influence on the display quality (deterioration in the display quality). The same applies to the transflective liquid crystal display device 1 in a transmissive mode.

In the pixel PX, the first divided pixels 50B1, 50R1, 50G1, and 50W1 corresponding to the least significant bit are arranged around the center PXC of the pixel PX and closest to the center PXC. In the pixel PX, the second divided pixels 50B2, 50R2, 50G2, and 50W2 as display regions corresponding to a higher significant bit of the area coverage modulation are arranged away from the center PXC of the pixel PX. The pixel PX with such a structure has smaller lengths of the space $65_{AI}$ and the space $65_{BI}$, so that the effective reflection area ratio can be enhanced. As a result, the pixel PX has improved display quality in the reflective display.

The sub-pixels 50B, 50R, 50G, and 50W have a square shape in a plan view. The first divided pixels 50B1, 50R1, 50G1, and 50W1 has a square shape in a plan view. The second divided pixels 50B2, 50R2, 50G2, and 50W2 has substantially an L-shape in which one corner of a square is removed in a plan view.

The first divided pixels 50B1, 50R1, 50G1, and 50W1 include coupling parts CB1, CR1, CG1, and CW1 through which a signal from the signal line 61 is applied to the divided electrodes 501B1, 501R1, 501G1, and 501W1, respectively. The second divided pixels 50B2, 50R2, 50G2, and 50W2 include coupling parts CB2, CR2, CG2, and CW2 through which the signal from the signal line 61 is applied to the divided electrodes 501B2, 501R2, 501G2, and 501W2, respectively.

The coupling parts CB1, CR1, CG1, and CW1 of the respective first divided pixels 50B1, 50R1, 50G1, and 50W1 corresponding to the least significant bit are arranged close to the center PXC of the pixel PX. The spacer SP illustrated in FIG. 4 is arranged at the coupling parts CB1, CR1, CG1, and CW1 concentrated around the center PXC of the pixel PX. The coupling parts CB1, CR1, CG1, and CW1 are regions where the divided electrodes 501B1, 501R1, 501G1, and 501W1 as reflective electrodes do not reflect light. By arranging the spacer SP at the coupling parts CB1, CR1, CG1, and CW1, it is possible to minimize reduction in reflection efficiency of light due to the spacer SP. Also in the transmissive liquid crystal display device, it is possible to minimize shielding of the transmitted light due to the spacer SP.

Figure 11:
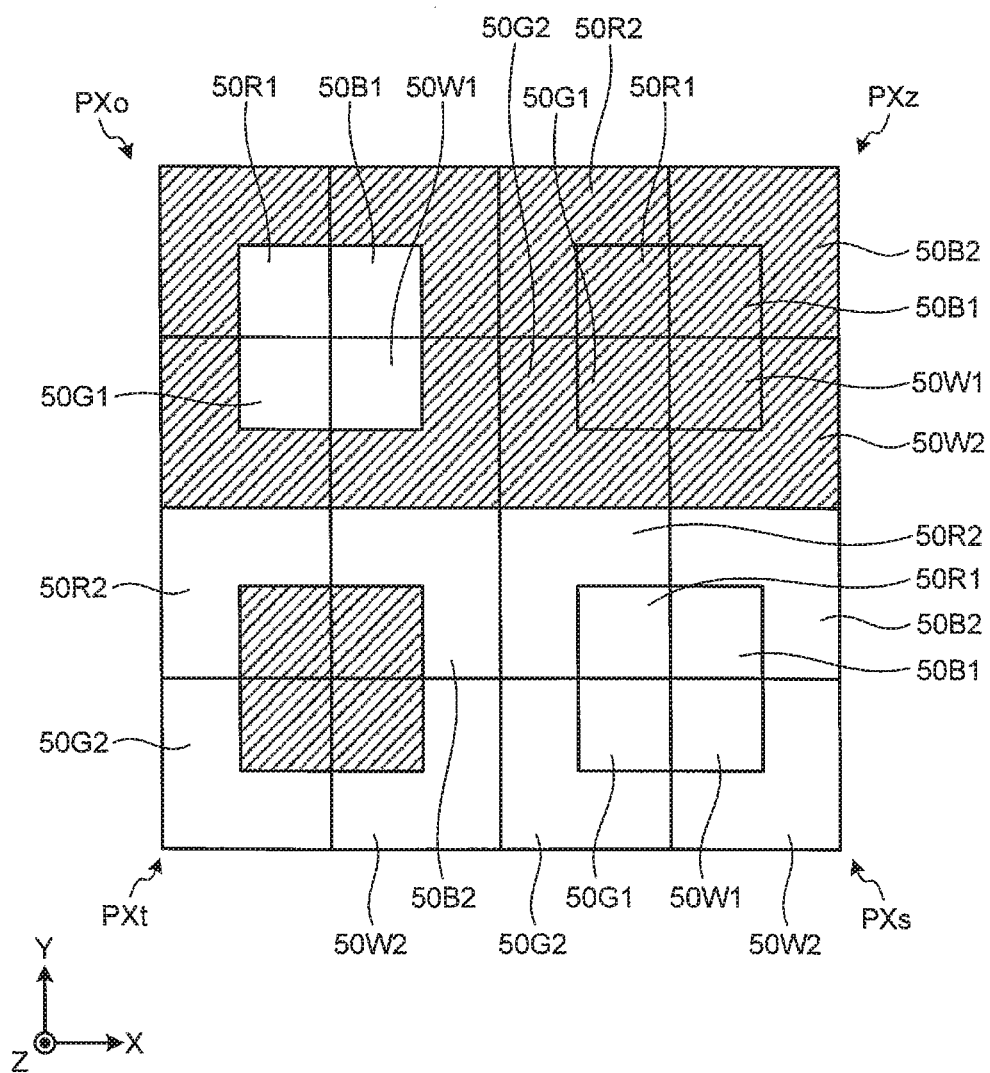
FIG. 11 is a diagram illustrating gradation expression with the pixel of the transflective liquid crystal display device according to the present embodiment.

FIG. 11 is a diagram illustrating gradation expression with the pixel of the transflective liquid crystal display device according to the present embodiment. FIG. 11 illustrates a state in which four pixels PXz, PXo, PXt, and PXs express a gradation of zero, a gradation of one, a gradation of two, and a gradation of three, respectively, in this order. In a gradation of zero, the brightness of the pixel PX is 0. As the gradation number increases, the brightness of the pixel PX increases. The pixel PXz has a gradation of zero where all of the first divided pixels 50B1, 50R1, 50G1, and 50W1 and the second divided pixels 50B2, 50R2, 50G2, and 50W2 are in the "OFF" state. The pixel PXo has a gradation of one where all of the first divided pixels 50B1, 50R1, 50G1, and 50W1 are in the "ON" state, and all of the second divided pixels 50B2, 50R2, 50G2, and 50W2 are in the "OFF" state. The pixel PXt has a gradation of two where all of the first divided pixels 50B1, 50R1, 50G1, and 50W1 are in the "OFF" state, and all of the second divided pixels 50B2, 50R2, 50G2, and 50W2 are in the "ON" state. The pixel PXs has a gradation of three where all of the first divided pixels 50B1, 50R1, 50G1, and 50W1 and the second divided pixels 50B2, 50R2, 50G2, and 50W2 are in the "ON" state. As illustrated in FIG. 11, even when the pixels PXz, PXo, PXt, and PXs are expressed in gradations different from each other, each of the gradations can be displayed in a clearly distinguishable manner. In this way, the transflective liquid crystal display device 1 including the pixels PXz, PXo, PXt, and PXs can reduce degradation in gradation expression. Similarly to the transflective liquid crystal display device 1, even the transmissive liquid crystal display device and the transflective liquid crystal display device can reduce degradation in gradation expression if they include the pixels PXz, PXo, PXt, and PXs.

Figure 12:
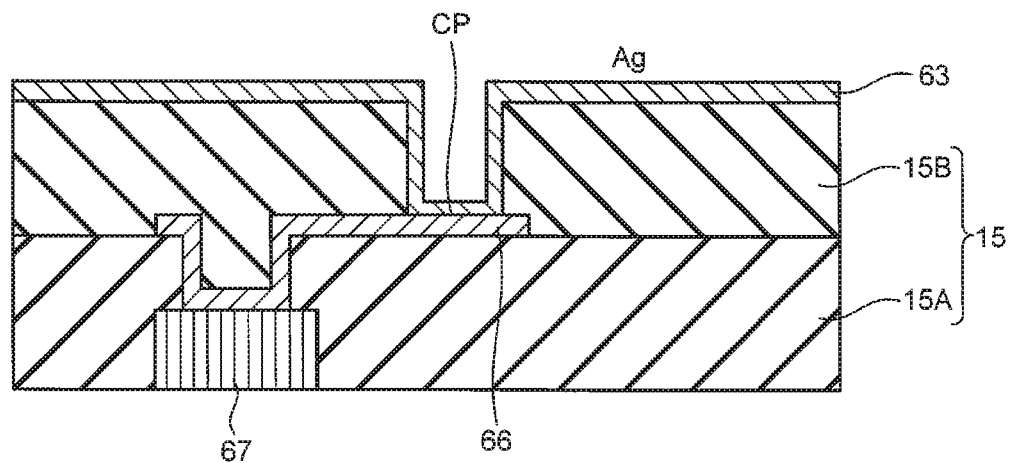
FIG. 12 is an enlarged view of a coupling part of a first divided pixel and a second divided pixel.

FIG. 12 is an enlarged view of a coupling part of the first divided pixel and the second divided pixel. In the following description, the divided electrodes 501B1, 501R1, 501G1, and 501W1 and the divided electrode 501B2, 501R2, 501G2, 501W2 will be described as the reflective electrode 63. The coupling parts CB1, CR1, CG1, and CW1 and the coupling parts CB2, CR2, CG2, and CW2 will be described as a coupling part CP.

The planarization film 15 formed above a surface of the first substrate 14 has a double-layer structure in which a first planarization layer 15A and a second planarization layer 15B are laminated in this order. On a surface of the second planarization layer 15B, formed is the reflective electrode 63 as an electrode corresponding to the first divided pixels 50B1, 50R1, 50G1, and 50W1 and the second divided pixels 50B2, 50R2, 50G2, and 50W2. The first planarization layer 15A is formed between the second planarization layer 15B and a signal supply conductor 67 for supplying a video signal to each of the pixels PX, more specifically, each of the first divided pixels 50B1, 50R1, 50G1, and 50W1 and the second divided pixels 50B2, 50R2, 50G2, and 50W2. A conductor 66 is provided between the first planarization layer 15A and the second planarization layer 15B. The conductor 66 electrically couples the reflective electrode 63 and the signal supply conductor 67. The conductor 66 and the reflective electrode 63 are coupled at the coupling part CP. The coupling part CP is a part where the second planarization layer 15B is partially removed to the conductor 66 formed on the surface of the first planarization layer 15A, and the reflective electrode 63 formed on the surface of the second planarization layer 15B and the signal supply conductor 67 are electrically coupled. A smaller thickness of the second planarization layer 15B leads to a smaller inside diameter of the coupling part CP.

The conductor 66 is made of ITO, for example. The signal supply conductor 67 corresponds to the common connection node $N_{out}$ of the other terminals of the switch elements 55 and 56 illustrated in FIG. 8, for example. The first planarization layer 15A is partially removed to the signal supply conductor 67, and the conductor 66 formed on the surface of the first planarization layer 15A is electrically coupled to the signal supply conductor 67.

In this way, in the present embodiment, the planarization film 15 is configured to have a double-layer structure, and the reflective electrode 63 and the signal supply conductor 67 are electrically coupled to each other through the conductor 66 provided between the first planarization layer 15A and the second planarization layer 15B. With such a structure, the coupling part CP can be provided at an optional position. As a result, it is possible to relieve restriction on the position of the coupling part CP due to the layout of wiring including the signal supply conductor 67 formed on the first substrate 14. As a result, it is possible to relatively easily achieve a structure in which the divided pixel corresponding to the least significant bit is arranged closest to the center of the pixel and the divided pixel corresponding to a higher bit is arranged at the outside thereof.

Figure 13:
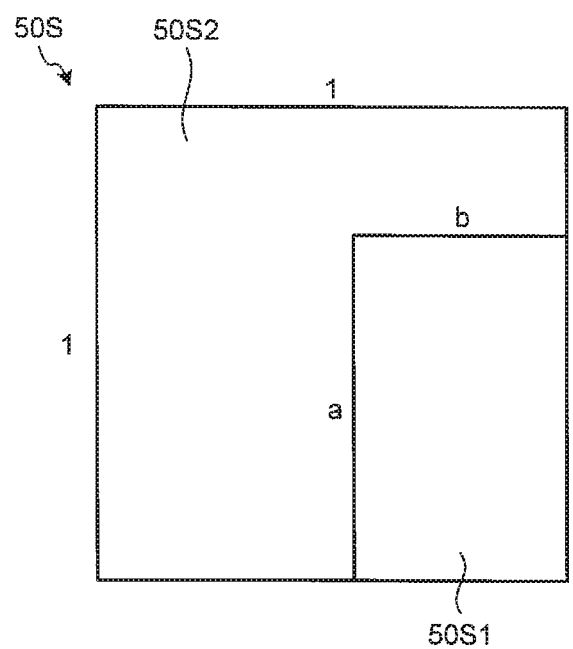
FIG. 13 is a diagram illustrating one sub-pixel.

FIG. 13 is a diagram illustrating one sub-pixel. In the following description, the sub-pixels 50B, 50R, 50G, and 50W included in the pixel PX illustrated in FIG. 11 will be generalized to be denoted as a sub-pixel 50S. The first divided pixels 50B1, 50R1, 50G1, and 50W1 will be generalized to be denoted as a first divided pixel 50S1. The second divided pixels 50B2, 50R2, 50G2, and 50W2 will be generalized to be denoted as a second divided pixel 50S2. In this example, the sub-pixel 50S has a square shape of which side length is 1. The first divided pixel 50S1 has a rectangular (including a square) shape of which the length of one side is "a" and the length of the other side is "b".

In the area coverage modulation, a ratio (area ratio) between the area (a×b) of the first divided pixel 50S1 and the area (1−a×b) of the second divided pixel 50S2 needs to have the relation: (a×b):(1−a×b)=1:2. Assuming that K=a+b, the effective reflection area is largest when K is smallest. The area ratio described above gives b=1/(3×a), so that K=a+1/(3×a). When K is differentiated with respect to "a", K'=1−3/a², so that "a" is 1/√3 when K is smallest, that is, K'=0. The relation between b=1/(3×a) and a=1/√3 gives b=1/√3. That is, when the second divided pixel 50S2 has a square shape, it is preferred that the first divided pixel 50S1 has a square shape in which a=b to maximize the effective reflection area. In this case, a ratio between the length of the sides of the second divided pixel 50S2 and the length of the sides of the first divided pixel 50S1 is 1:1/√3. It is not excluded that the first divided pixel 50S1 has a rectangular shape having the long side and the short side.

Comparison Between the Present Embodiment and a First Comparative Example

Figure 14:
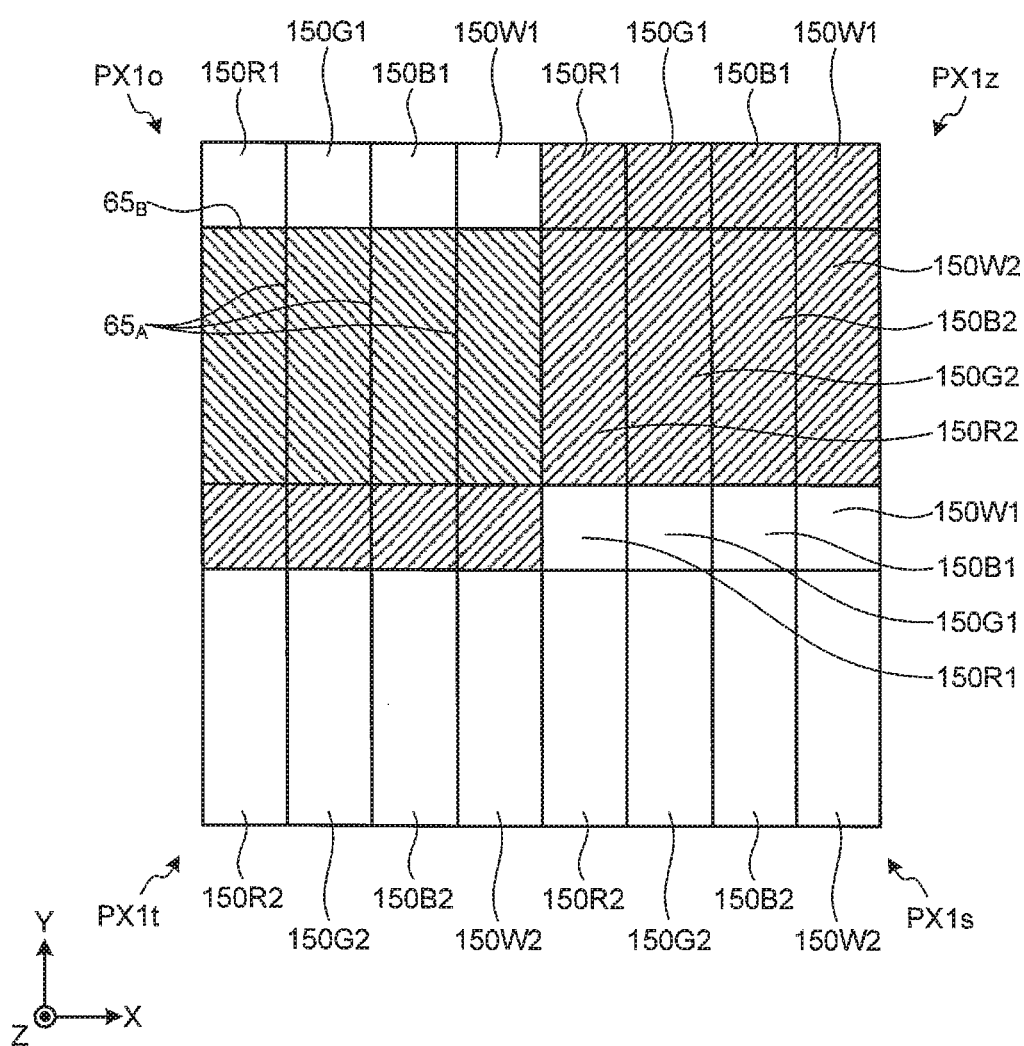
FIG. 14 is a diagram illustrating gradation expression with a pixel according to a first comparative example.

FIG. 14 is a diagram illustrating gradation expression with the pixel according to a first comparative example. In the first comparative example, pixels PX1z, PX1o, PX1t, and PX1s has a structure in which sub-pixels extending in the Y-direction are arranged in the X-direction. When not being distinguished, they are referred to as a pixel PX1. A sub-pixel representing red includes a first divided pixel 150R1 and a second divided pixel 150R2. A sub-pixel representing green includes a first divided pixel 150G1 and a second divided pixel 150G2. A sub-pixel representing blue includes a first divided pixel 150B1 and a second divided pixel 150B2. A sub-pixel representing white includes a first divided pixel 150W1 and a second divided pixel 150W2.

In the first comparative example, the pixel PX1z expresses a gradation of zero, the pixel PX1o expresses a gradation of one, the pixel PX1t expresses a gradation of two, and the pixel PX1s expresses a gradation of three. In this case, the same display as the pixel PX1z displaying in a gradation of zero appears at a portion where the pixel PX1o displaying in a gradation of one is adjacent to the pixel PX1t displaying in a gradation of two in the Y-direction. As a result, in the first comparative example, it is difficult to clearly distinguish and display each of the gradations when the four pixels PX1z, PX1o, PX1t, and PX1s arranged in a square shape display in gradations different from each other. In contrast, in the present embodiment, as illustrated in FIG. 11, each of the gradations can be displayed in a clearly distinguishable manner even when the four pixels PXz, PXo, PXt, and PXs arranged in a square shape display in gradations different from each other.

In the first comparative example, each pixel PX1 includes three spaces $65_A$ extending in the Y-direction and one space $65_B$ extending in the X-direction. The pixel PX1 has a square shape, and each of the spaces $65_A$ and the space $65_B$ is parallel to any one side of the pixel PX1. Assuming that the length thereof is 1, the total length of the spaces $65_A$ and the space $65_B$ included in one pixel PX1 is 4.

In the present embodiment, as illustrated in FIG. 10, the pixel PX includes one space $65_A$ and two spaces $65_{AI}$ extending in the Y-direction, and one space $65_B$ and two spaces $65_{BI}$ extending in the X-direction. The pixel PX has a square shape, and each of the space $65_A$, spaces $65_{AI}$, space $65_B$, and spaces $65_{BI}$ is parallel to any one side of the pixel PX1. The first divided pixels 50B1, 50R1, 50G1, and 50W1 has a square shape, and an area ratio thereof with respect to the second divided pixels 50B2, 50R2, 50G2, and 50W2 is 1:2. In this case, a ratio between the sides of each sub-pixel 50B, 50R, 50G, and 50W having a square shape included in the pixel PX and the sides of each first divided pixels 50B1, 50R1, 50G1, and 50W1 having a square shape is $1:1/\sqrt{3}$. Assuming that the length of the space $65_A$ and the space $65_B$ is 1, the length of the space $65_{AI}$ and the space $65_{BI}$ is $\sqrt{3}$. Accordingly, the total length of the space $65_A$, the spaces $65_{AI}$, the space $65_B$, and the spaces $65_{BI}$ included in one pixel PX is given by: $2+4/\sqrt{3}=4.31$.

Assuming that the widths of the space $65_A$, the space $65_{AI}$, the space $65_B$, and the space $65_{BI}$ are the same in the first comparative example and the present embodiment, the total length of the space $65_A$, the space $65_{AI}$, the space $65_B$, and the space $65_{BI}$ included in the pixel PX of the present embodiment is slightly larger than the total length of the space $65_A$ and the space $65_B$ included in the pixel PX1 of the first comparative example. As a result, in the present embodiment, an effective reflection area ratio substantially equivalent to that in the first comparative example can be secured, so that the display quality in the reflective display is substantially equivalent to that of the first comparative example.

Comparison Between the Present Embodiment and a Second Comparative Example

Figure 15:
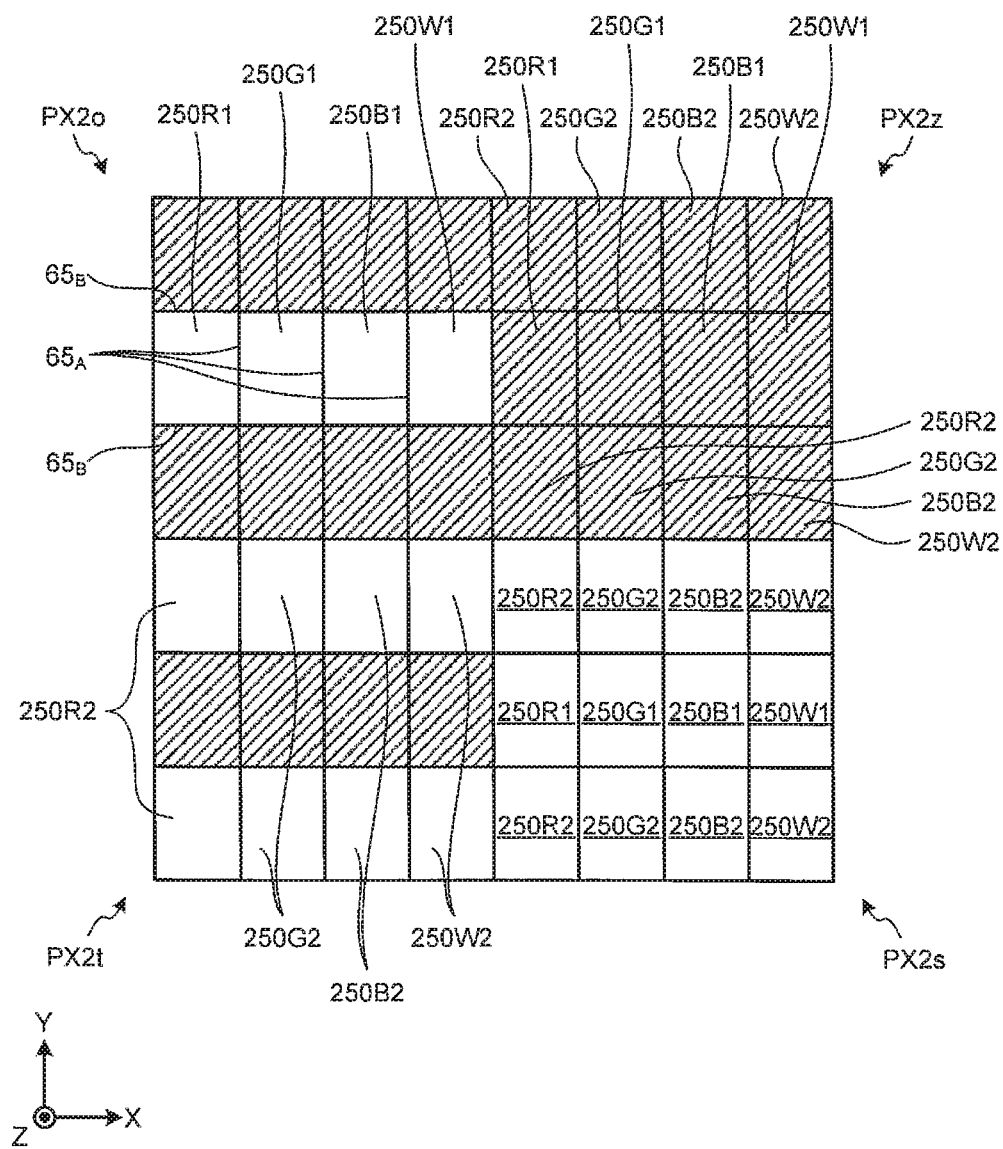
FIG. 15 is a diagram illustrating gradation expression with a pixel according to a second comparative example.

FIG. 15 is a diagram illustrating gradation expression with a pixel according to a second comparative example. In the second comparative example, pixels PX2z, PX2o, PX2t, and PX2s has a structure in which sub-pixels extending in the Y-direction are arranged in the Y-direction. When not being distinguished, they are referred to as a pixel PX2. A sub-pixel representing red includes a first divided pixel 250R1 and two second divided pixels 250R2 arranged at both sides in the Y-direction of the first divided pixel 250R1. A sub-pixel representing green includes a first divided pixel 250G1 and two second divided pixels 250G2 arranged at both sides in the Y-direction of the first divided pixel 250G1. A sub-pixel representing blue includes a first divided pixel 250B1 and two second divided pixels 250B2 arranged at both sides in the Y-direction of the first divided pixel 250B1. A sub-pixel representing white includes a first divided pixel 250W1 and two second divided pixels 250W2 arranged at both sides in the Y-direction of the first divided pixel 250W1.

In the second comparative example, the pixel PX2z expresses a gradation of zero, the pixel PX2o expresses a gradation of one, the pixel PX2t expresses a gradation of two, and the pixel PX2s expresses a gradation of three. In this case, as illustrated in FIG. 15, each of the gradations can be displayed in a clearly distinguishable manner even when the four pixels PX2z, PX2o, PX2t, and PX2s arranged in a square shape display in gradations different from each other. The same applies to four pixels PXz, PXo, PXt, and PXs of the present embodiment illustrated in FIG. 11.

In the second comparative example, each pixel PX2 includes three spaces $65_A$ extending in the Y-direction and two spaces $65_B$ extending in the X-direction. The pixel PX2 has a square shape, and each of the spaces $65_A$ and the spaces $65_B$ is parallel to any one side of the pixel PX2. Assuming that the length thereof is 1, the total length of the spaces $65_A$ and the spaces $65_B$ included in one pixel PX2 is 5. As described above, in the present embodiment, the total length of the space $65_A$, the spaces $65_{AI}$, the space $65_B$, and the spaces $65_{BI}$ included in one pixel PX is given by: $2+4/\sqrt{3}=4.31$.

Assuming that the widths of the space $65_A$, the space $65_{AI}$, the space $65_B$, and the space $65_{BI}$ are the same in the second comparative example and the present embodiment, the total length of the space $65_A$, the space $65_{AI}$, the space $65_B$, and the space $65_{BI}$ included in the pixel PX of the present embodiment is smaller than the total length of the space $65_A$ and the space $65_B$ included in the pixel PX2 of the second comparative example. Accordingly, the effective reflection area ratio in the present embodiment is larger than that in the second comparative example, so that the display quality in the reflective display is higher than that in the second comparative example.

Comparison Between the Present Embodiment and a Third Comparative Example

Figure 16:
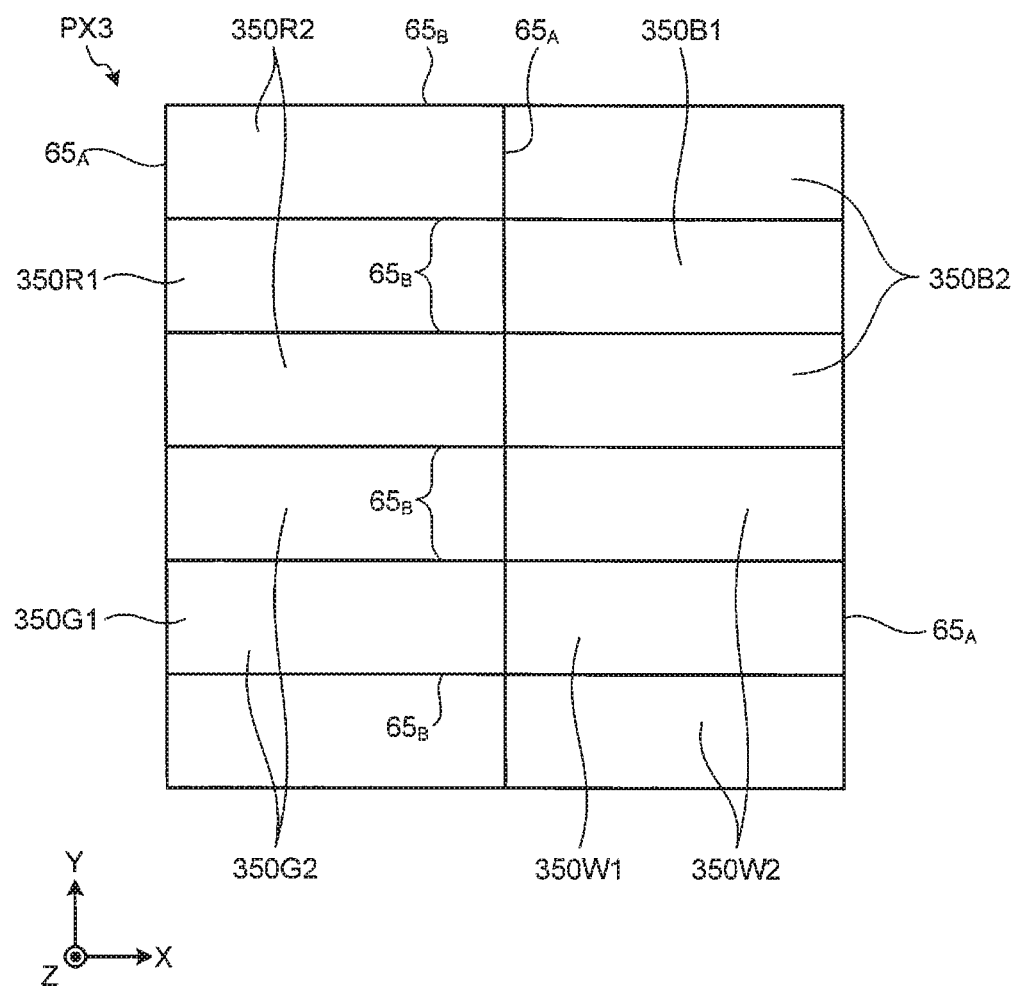
FIG. 16 is a diagram illustrating a pixel according to a third comparative example.
Figure 17:
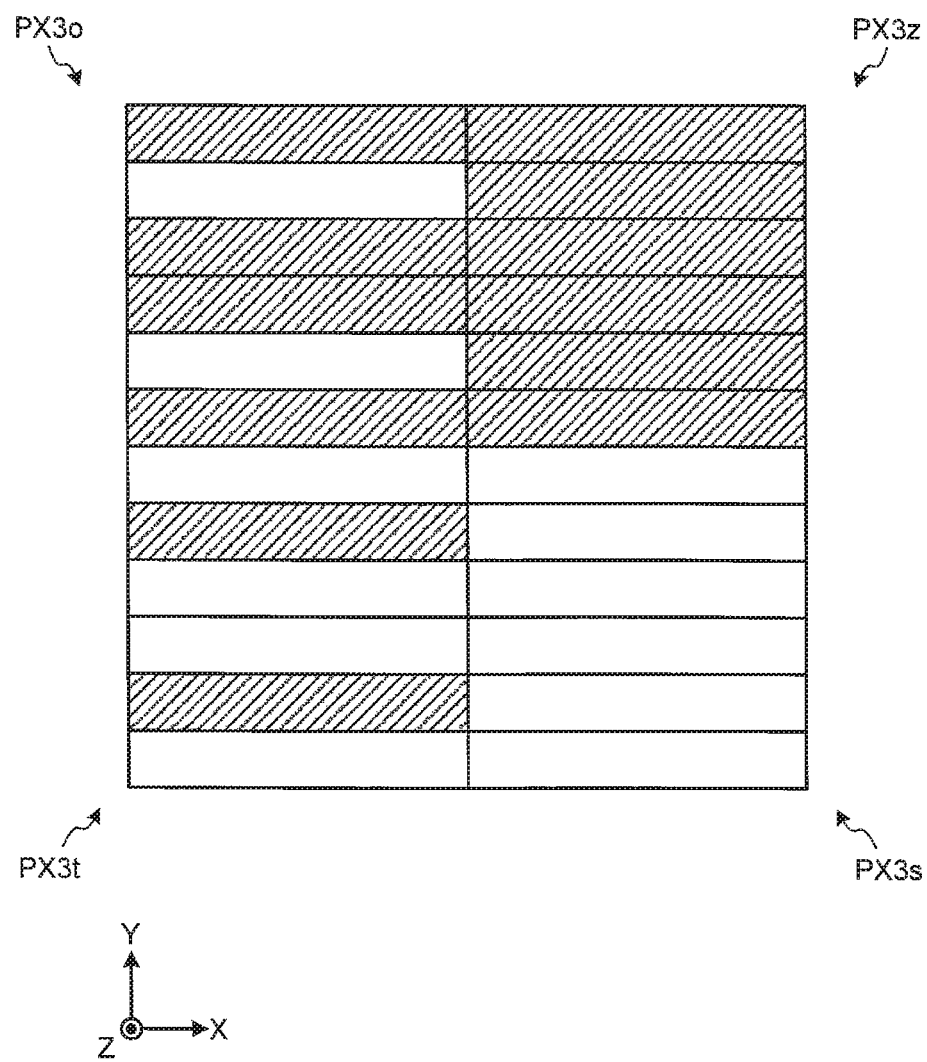
FIG. 17 is a diagram illustrating gradation expression with a pixel according to the third comparative example.

FIG. 16 is a diagram illustrating a pixel according to a third comparative example. FIG. 17 is a diagram illustrating gradation expression with the pixel according to the third comparative example. In the third comparative example, the pixel PX3 has a structure in which sub-pixels extending in the X-direction are arranged in the Y-direction. A sub-pixel representing blue includes a first divided pixel 350B1 extending in the X-direction and two second divided pixels 350B2 that are arranged at both sides in the Y-direction of the first divided pixel 350B1 and extend in the X-direction. A sub-pixel representing red includes a first divided pixel 350R1 extending in the X-direction and two second divided pixels 350R2 that are arranged at both sides in the Y-direction of the first divided pixel 350R1 and extend in the X-direction. A sub-pixel representing green includes a first divided pixel 350G1 extending in the X-direction and two second divided pixels 350G2 that are arranged at both sides in the Y-direction of the first divided pixel 350G1 and extend in the X-direction. A sub-pixel representing white includes a first divided pixel 350W1 extending in the X-direction and two second divided pixels 350W2 that are arranged at both sides in the Y-direction of the first divided pixel 350W1 and extend in the X-direction.

In the third comparative example, a pixel PX3z illustrated in FIG. 17 expresses a gradation of zero, a pixel PX3o expresses a gradation of one, a pixel PX3t expresses a gradation of two, and a pixel PX3s expresses a gradation of three. In this case, as illustrated in FIG. 17, each of the gradations can be displayed in a clearly distinguishable manner even when the four pixels PX3z, PX3o, PX3t, and PX3s arranged in a square shape display in gradations different from each other. The same applies to four pixels PXz, PXo, PXt, and PXs of the present embodiment illustrated in FIG. 11.

In the third comparative example, as illustrated in FIG. 16, each pixel PX3 includes one space $65_A$ extending in the Y-direction and five spaces $65_B$ extending in the X-direction. The pixel PX3 has a square shape, and each of the space $65_A$ and the spaces $65_B$ is parallel to any one side of the pixel PX3. Assuming that the length thereof is 1, the total length of the space $65_A$ and the spaces $65_B$ included in one pixel PX3 is 7. As described above, in the present embodiment, the total length of the space $65_A$, the spaces $65_{AI}$, the space $65_B$, and the spaces $65_{BI}$ included in one pixel PX is given by: $2+4/\sqrt{3}=4.31$.

Assuming that the widths of the space $65_A$, the space $65_{AI}$, the space $65_B$, and the space $65_{BI}$ are the same in the third comparative example and the present embodiment, the total length of the space $65_A$, the space $65_{AI}$, the space $65_B$, and the space $65_{BI}$ included in the pixel PX of the present embodiment is smaller than the total length of the space $65_A$ and the space $65_B$ included in the pixel PX3 of the third comparative example. Specifically, the total length of the spaces in the present embodiment is substantially 60% of that in the third comparative example. Accordingly, the effective reflection area ratio in the present embodiment is larger than that in the third comparative example, so that the display quality in the reflective display is higher than that in the third comparative example.

As described above, according to the present embodiment, one pixel has a structure in which each divided pixel corresponding to the least significant bit is arranged closest to the center of the pixel, and the divided pixel corresponding to a higher significant bit of the area coverage modulation is arranged away from the center of the pixel and around the center of the pixel. Accordingly, the present embodiment can achieve clear gradation expression and suppress reduction in the effective reflection area ratio or in the area of the divided pixels that contributes to display. As a result, in the present embodiment, it is possible to reduce effects on display quality caused by dividing the sub-pixel, and also reduce degradation in gradation expression.

1-7. First Modification

Figure 18:
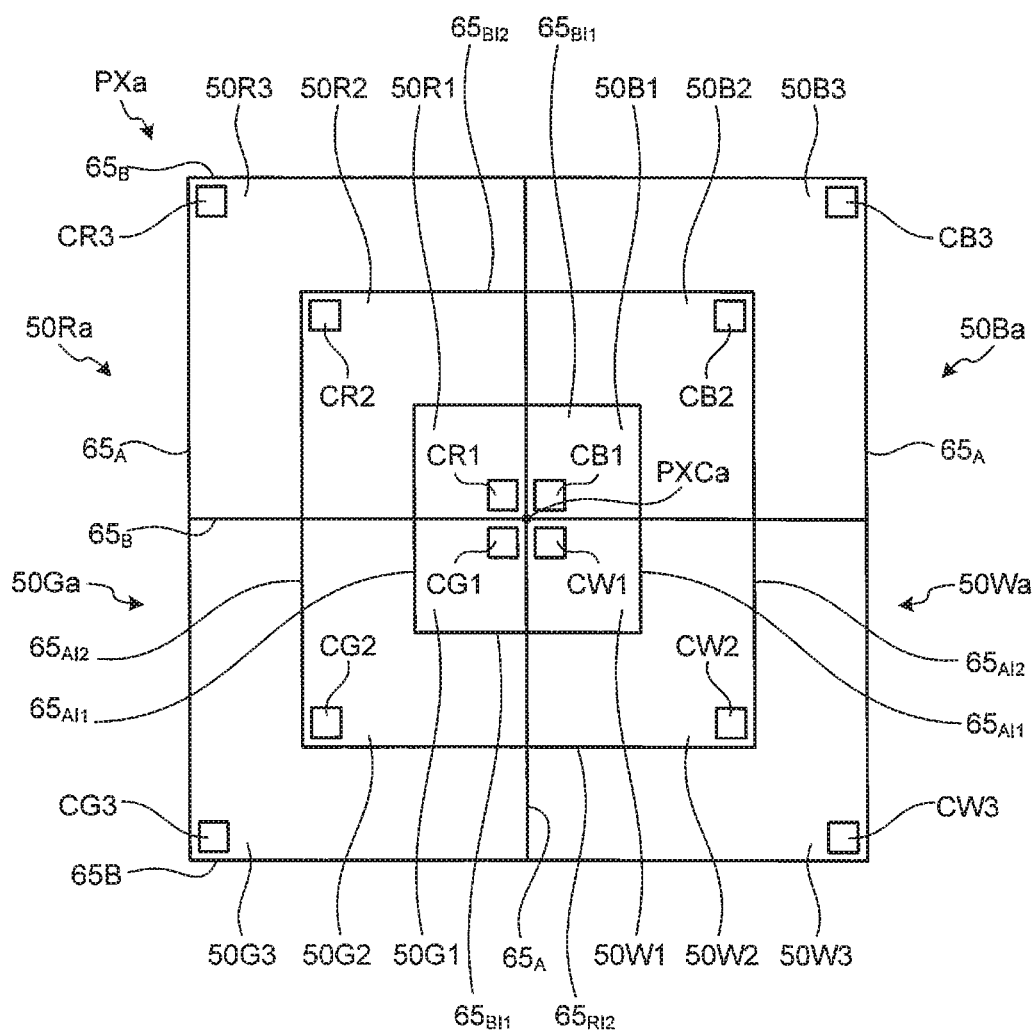
FIG. 18 is a diagram illustrating a pixel according to a first modification of the present embodiment.

FIG. 18 is a diagram illustrating a pixel according to a first modification of the present embodiment. Although the pixel PX described above is represented in 2 bits, a pixel PXa is represented in 3 bits. The pixel PXa can express 8-step gradation. The pixel PXa includes a sub-pixel 50Ba representing blue, a sub-pixel 50Ra representing red, a sub-pixel 50Ga representing green, and a sub-pixel 50Wa representing white. The sub-pixel 50Ba includes a first divided pixel 50B1, a second divided pixel 50B2, and a third divided pixel 50B3. The sub-pixel 50Ra includes a first divided pixel 50R1, a second divided pixel 50R2, and a third divided pixel 50R3. The sub-pixel 50Ga includes a first divided pixel 50G1, a second divided pixel 50G2, and a third divided pixel 50G3. The sub-pixel 50Wa includes a first divided pixel 50W1, a second divided pixel 50W2, and a third divided pixel 50W3.

The first divided pixels 50B1, 50R1, 50G1, and 50W1 are display regions of the sub-pixels 50Ba, 50Ra, 50Ga, and 50Wa corresponding to the least significant bit, respectively. The second divided pixels 50B2, 50R2, 50G2, and 50W2 are display regions of the sub-pixels 50Ba, 50Ra, 50Ga, and 50Wa corresponding to the next less significant bit than the least significant bit, respectively. The second divided pixels 50B3, 50R3, 50G3, and 50W3 are display regions of the sub-pixels 50Ba, 50Ra, 50Ga, and 50Wa corresponding to the second higher bit than the least significant bit, respectively. In the present modification, the third divided pixels 50B3, 50R3, 50G3, and 50W3 correspond to the most significant bits of the respective sub-pixels 50Ba, 50Ra, 50Ga, and 50Wa.

The first divided pixels 50B1, 50R1, 50G1, and 50W1 are arranged around the center PXCa of the pixel PXa. They are arranged closest to the center PXCa. The second divided pixels 50B2, 50R2, 50G2, and 50W2 corresponding to a higher bit than the first divided pixels 50B1, 50R1, 50G1, and 50W1 are arranged at the outside of the first divided pixels 50B1, 50R1, 50G1, and 50W1. They are arranged to surround the center PXCa of the pixel PXa. The third divided pixels 50B3, 50R3, 50G3, and 50W3 corresponding to a higher bit than the second divided pixels 50B2, 50R2, 50G2, and 50W2 are arranged at the outside of the second divided pixels 50B2, 50R2, 50G2, and 50W2. They are also arranged to surround the center PXCa of the pixel PXa.

The first divided pixels 50B1, 50R1, 50G1, and 50W1 include the coupling parts CB1, CR1, CG1, and CW1, respectively, at which each divided electrode thereof is electrically coupled to the conductor 66 illustrated in FIG. 12. The second divided pixels 50B2, 50R2, 50G2, and 50W2 include the coupling parts CB2, CR2, CG2, and CW2, respectively, at which each divided electrode thereof is electrically coupled to the conductor 66 illustrated in FIG. 12. The third divided pixels 50B3, 50R3, 50G3, and 50W3 include coupling parts CB3, CR3, CG3, and CW3, respectively, at which each divided electrode thereof is electrically coupled to the conductor 66 illustrated in FIG. 12.

With such a structure, the pixel PXa can express 8-step gradation. Similarly to the present embodiment described above, the pixel PXa can achieve clear gradation expression and enhance the effective reflection area ratio to improve the display quality in the reflective display.

1-8. Second Modification

Figure 19:
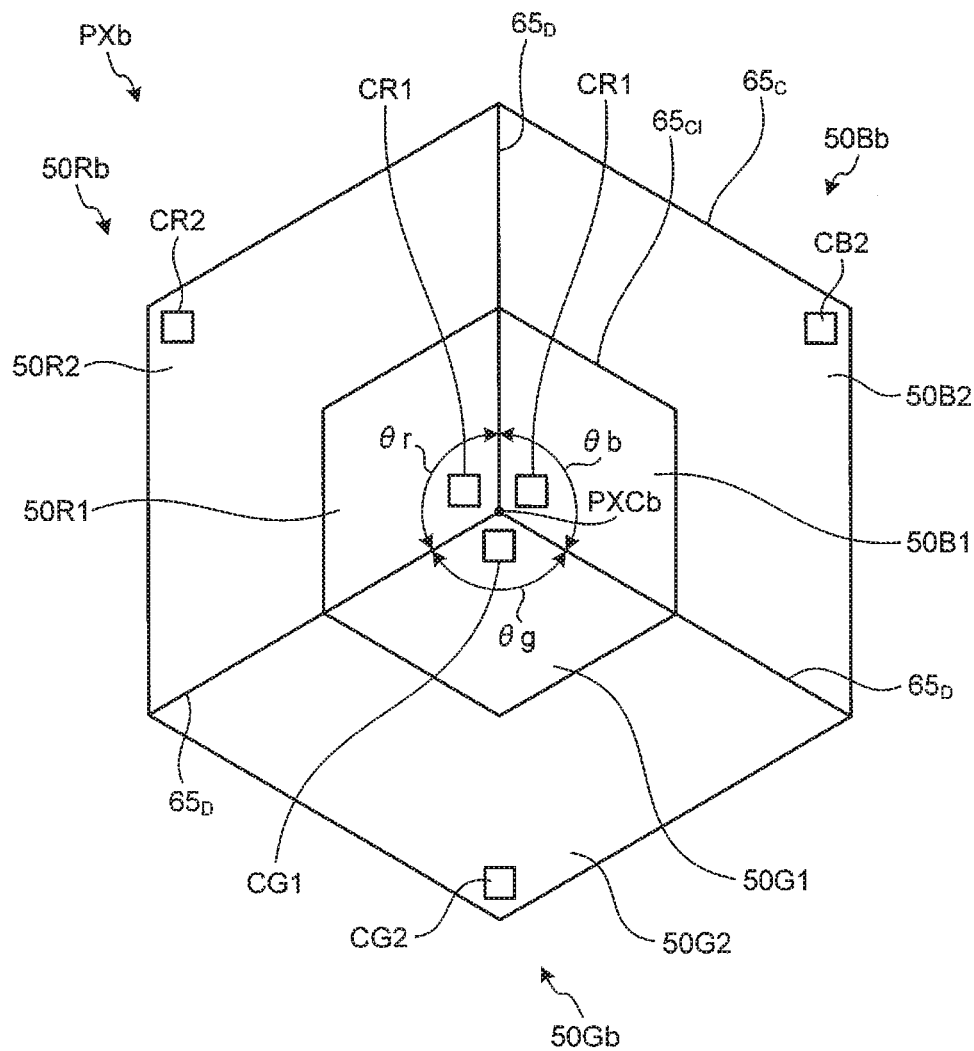
FIG. 19 is a diagram illustrating a pixel according to a second modification of the present embodiment.

FIG. 19 is a diagram illustrating a pixel according to a second modification of the present embodiment. The pixel PX and the pixel PXa described above represent the four colors of blue, red, green, and white, whereas a pixel PXb represents three colors of blue, red, and green. The pixel PXb is represented in 2 bits and can express 4-step gradation. The pixel PXb has a hexagonal shape (in this example, a regular hexagonal shape) in a plan view. Specifically, the pixel PXb is the inside region surrounded by a space $65_C$ dividing the pixel PXb from adjacent pixels PXb. The pixel PXb includes a sub-pixel 50Bb representing blue, a sub-pixel 50Rb representing red, and a sub-pixel 50Gb representing green.

The three sub-pixels 50Bb, 50Rb, and 50Gb are display regions in a range of central angles θb, θr, and θg, respectively, with respect to the center PXCb of the pixel PXb. The sub-pixels 50Bb, 50Rb, and 50Gb are inside regions surrounded by two spaces $65_D$ radially extending from the center PXCb of the pixel PXb and the space $65_C$. The sub-pixels 50Bb, 50Rb, and 50Gb has a diamond shape. The areas of the respective sub-pixels 50Bb, 50Rb, and 50Gb are the same. Accordingly, the central angles are: θb=θr=θg=120°. The areas of the sub-pixels 50Bb, 50Rb, and 50Gb may be changed depending on the characteristics and the like of the color filter 22 corresponding to the sub-pixels 50Bb, 50Rb, and 50Gb. These areas can be changed by making the central angles θb, θr, and θg different from each other.

The sub-pixel 50Bb includes a first divided pixel 50B1 and a second divided pixel 50B2. The sub-pixel 50Rb includes a first divided pixel 50R1 and a second divided pixel 50R2. The sub-pixel 50Gb includes a first divided pixel 50G1 and a second divided pixel 50G2. The first divided pixels 50B1, 50R1, and 50G1 are display regions of the sub-pixels 50Bb, 50Rb, and 50Gb corresponding to the least significant bit. The second divided pixels 50B2, 50R2, and 50G2 are display regions of the sub-pixels 50Bb, 50Rb, and 50Gb corresponding to the most significant bits of the respective sub-pixels 50Bb, 50Rb, and 50Gb.

The first divided pixels 50B1, 50R1, and 50G1 are regions surrounded by the space $65_{CI}$ partitioning the sub-pixels 50Bb, 50Rb, and 50Gb into two regions and the two spaces $65_D$ radially extending from the center PXCb of the pixel PXb. The second divided pixels 50B2, 50R2, and 50G2 are regions surrounded by the space $65_{CI}$ partitioning each of the sub-pixels 50Bb, 50Rb, and 50Gb into two regions, the two spaces $65_D$ radially extending from the center PXbC of the pixel PXb, and the space $65_C$.

The first divided pixels 50B1, 50R1, and 50G1 are arranged around the center PXCb of the pixel PXb. They are arranged closest to the center PXCb. The second divided pixels 50B2, 50R2, and 50G2 corresponding to a higher bit (in the present modification, the most significant bit) than the first divided pixels 50B1, 50R1, and 50G1 are arranged at the outside of the first divided pixels 50B1, 50R1, and 50G1. They are arranged to surround the center PXCb of the pixel PXb.

The first divided pixels 50B1, 50R1, and 50G1 include the coupling parts CB1, CR1, and CG1, respectively, at which each divided electrode thereof is electrically coupled to the conductor 66 illustrated in FIG. 12. The second divided pixels 50B2, 50R2, and 50G2 include the coupling parts CB2, CR2, and CG2, respectively, at which each divided electrode thereof is electrically coupled to the conductor 66 illustrated in FIG. 12.

With such a structure, the pixel PXb can express 4-step gradation with three-color display of blue, red, and green. Similarly to the present embodiment described above and the modifications thereof, the pixel PXb can achieve clear gradation expression and enhance the effective reflection area ratio to improve the display quality in the reflective display. Although the present embodiment, the first modification, and the second modification describe an example of having three or four sub-pixels, the number of sub-pixels is not limited thereto. For example, one pixel may have five or more sub-pixels.

2. Electronic Apparatus

The transflective liquid crystal display device 1 according to the present disclosure described above can be used as a display unit (display device) of an electronic apparatus in various fields that displays a video signal input to the electronic apparatus or a video signal generated in the electronic apparatus as an image or video. The following describes a specific example of the electronic apparatus to which the transflective liquid crystal display device 1 is applied as a display unit, that is, the electronic apparatus according to the present disclosure.

Application Example 1

Figure 20:
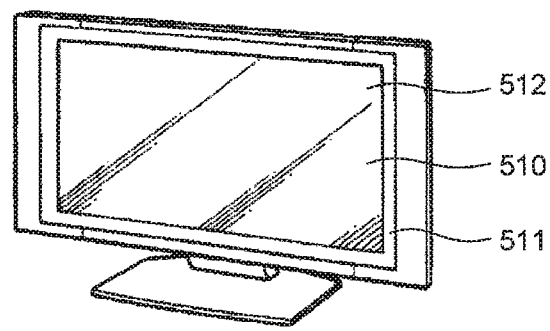
FIG. 20 is a diagram illustrating a television apparatus to which the transflective liquid crystal display device is applied.

The electronic apparatus illustrated in FIG. 20 is a television apparatus to which the transflective liquid crystal display device 1 is applied. For example, the television apparatus includes a video display screen unit 510 including a front panel 511 and a filter glass 512, and the transflective liquid crystal display device 1 is applied to the video display screen unit 510. That is, the screen of the television apparatus may have a function for detecting a touch operation in addition to a function for displaying an image.

Application Example 2

Figure 21:
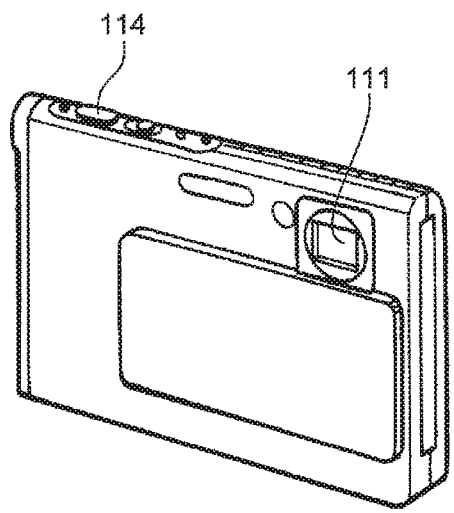
FIG. 21 is a diagram illustrating a digital camera to which the transflective liquid crystal display device is applied.
Figure 22:
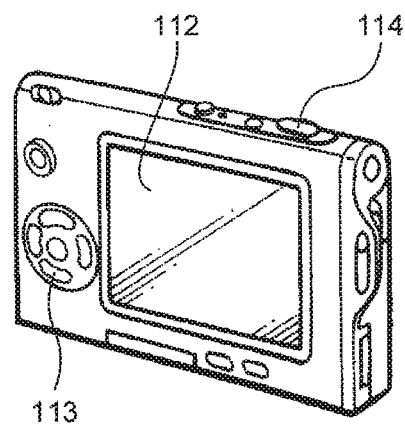
FIG. 22 is a diagram illustrating the digital camera to which the transflective liquid crystal display device is applied.

The electronic apparatus illustrated in FIG. 21 and FIG. 22 is a digital camera to which the transflective liquid crystal display device 1 is applied. For example, the digital camera includes a flash light emitting unit 521, a display unit 522, a menu switch 523, and a shutter button 524, and the transflective liquid crystal display device 1 is applied to the display unit 522. Accordingly, the display unit 522 of the digital camera may have a function for detecting a touch operation in addition to a function for displaying an image.

Application Example 3

Figure 23:
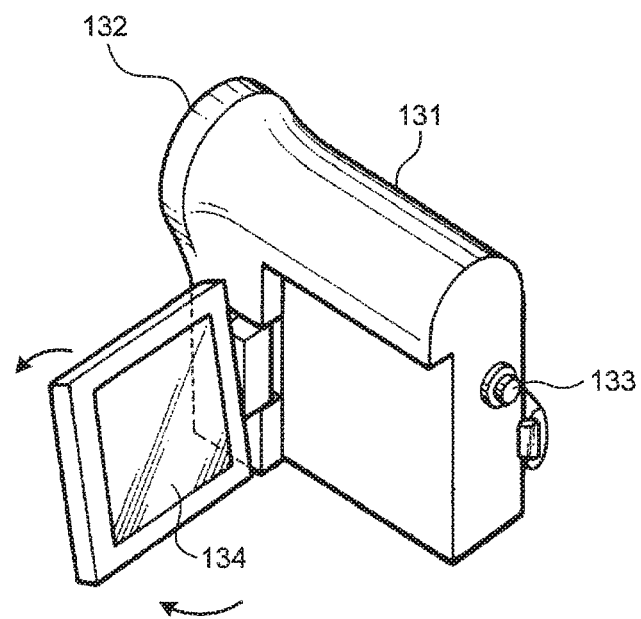
FIG. 23 is a diagram illustrating the external appearance of a video camera to which the transflective liquid crystal display device is applied.

The electronic apparatus illustrated in FIG. 23 represents the external appearance of a video camera to which the transflective liquid crystal display device 1 is applied. For example, the video camera includes a main body part 531, a lens 532 for photographing a subject provided on the front side surface of the main body part 531, a start/stop switch 533 for photographing, and a display unit 534. The transflective liquid crystal display device 1 is applied to the display unit 534. Accordingly, the display unit 534 of the video camera may have a function for detecting a touch operation in addition to a function for displaying an image.

Application Example 4

Figure 24:
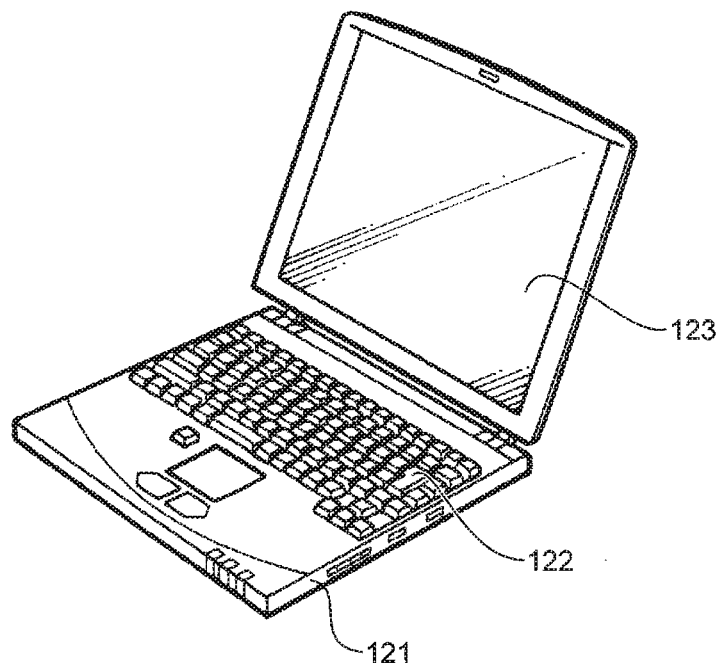
FIG. 24 is a diagram illustrating a laptop personal computer to which the transflective liquid crystal display device is applied.

The electronic apparatus illustrated in FIG. 24 is a laptop personal computer to which the transflective liquid crystal display device 1 is applied. For example, the laptop personal computer includes a main body 541, a keyboard 542 for input operation of characters and the like, and a display unit 543 for displaying an image. The transflective liquid crystal display device 1 is applied to the display unit 543. Accordingly, the display unit 543 of the laptop personal computer may have a function for detecting a touch operation in addition to a function for displaying an image.

Application Example 5

Figure 25:
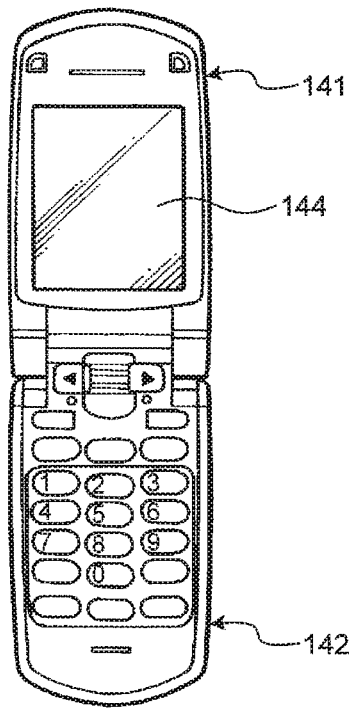
FIG. 25 is a front view of a mobile phone in an open state to which the present disclosure is applied.
Figure 26:
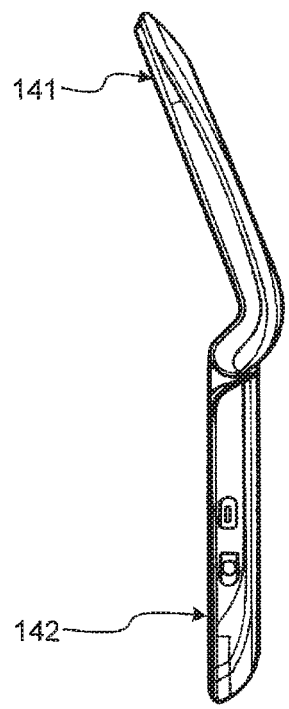
FIG. 26 is a right side view of the mobile phone in the open state to which the present disclosure is applied.
Figure 27:
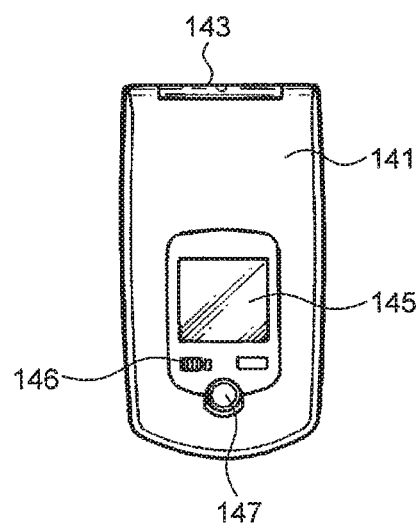
FIG. 27 is a top view of the mobile phone in a folded state to which the present disclosure is applied.
Figure 28:
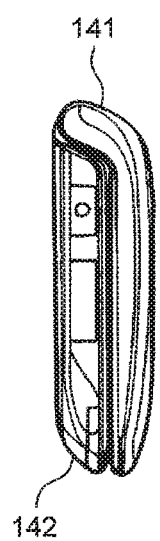
FIG. 28 is a left side view of the mobile phone in the folded state to which the present disclosure is applied.
Figure 29:
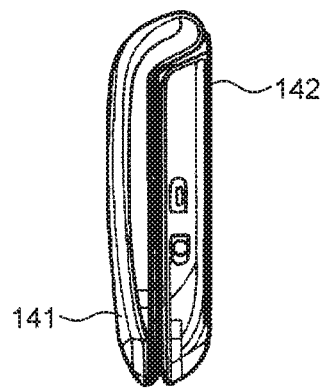
FIG. 29 is a right side view of the mobile phone in the folded state to which the present disclosure is applied.
Figure 30:
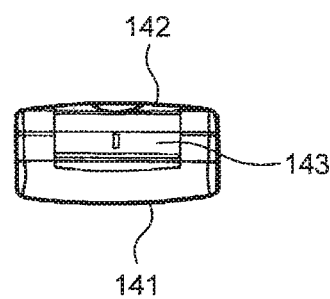
FIG. 30 is a rear view of the mobile phone in the folded state to which the present disclosure is applied.
Figure 31:
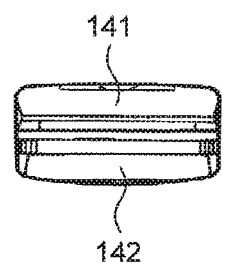
FIG. 31 is a front view of the mobile phone in the folded state to which the present disclosure is applied.

The electronic apparatus illustrated in FIG. 25 to FIG. 31 is a mobile phone to which the transflective liquid crystal display device 1 is applied. FIG. 25 is a front view of the mobile phone in an open state, FIG. 26 is a right side view of the mobile phone in the open state, FIG. 27 is a top view of the mobile phone in a folded state, FIG. 28 is a left side view of the mobile phone in the folded state, FIG. 29 is a right side view of the mobile phone in the folded state, FIG. 30 is a rear view of the mobile phone in the folded state, and FIG. 31 is a front view of the mobile phone in the folded state. For example, the mobile phone is formed by connecting an upper housing 551 and a lower housing 552 with a connecting part (hinge part) 553, and includes a display device 554, a sub-display device 555, a picture light 556, and a camera 557. The transflective liquid crystal display device 1 is attached as the display device 554. Accordingly, the display device 554 of the mobile phone may have a function for detecting a touch operation in addition to a function for displaying an image.

Application Example 6

Figure 32:
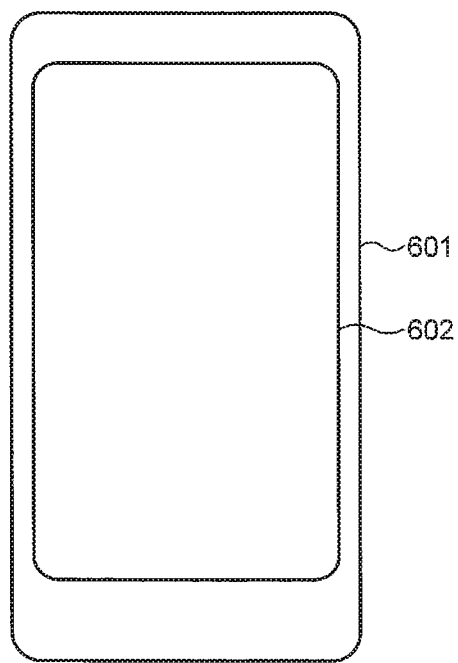
FIG. 32 is a diagram illustrating an information portable terminal to which the present disclosure is applied.

The electronic apparatus illustrated in FIG. 32 is an information portable terminal that operates as a portable computer, a multifunctional mobile phone, a portable computer allowing voice communication, or a communicable portable computer, and may be called a smart phone and/or a tablet terminal. For example, the information portable terminal includes a display unit 602 arranged on a surface of a housing 601. The display unit 562 is the transflective liquid crystal display device 1.

5. Aspects of Present Disclosure

The present disclosure includes aspects as follows.
(1) A display device comprising:
a plurality of pixels each including a plurality of sub-pixels, wherein
each of the sub-pixels is arranged around center of the corresponding pixel and divided into a plurality of display regions to perform N-bit area coverage modulation by a combination of the display regions, and
the display regions are arranged in such a manner that:
a display region corresponding to a least significant bit of the area coverage modulation is arranged closest to the center of the corresponding pixel; and
a display region corresponding to a higher significant bit of the area coverage modulation is arranged around the center of the pixel and further from the center of the corresponding pixel (N is a natural number of 2 or more).
(2) The display device according to (1), further comprising:
a second planarization layer on which a plurality of electrodes corresponding to the respective display regions are formed;
a first planarization layer formed between the second planarization layer and a first conductor for applying a video signal to be given to the corresponding electrode; and
a second conductor arranged between the first planarization layer and the second planarization layer to electrically couple the first conductor to the corresponding electrode.

(3) The display device according to (2), further comprising:
a liquid crystal layer arranged between the electrodes and a counter electrode opposite to the electrodes, wherein
each of the pixels is provided at a position close to the center thereof with a coupling part at which the electrode corresponding to the display region corresponding to the least significant bit is coupled to the corresponding second conductor, and arranges a spacer for forming a space to form the liquid crystal layer at the coupling part.
(4) The display device according to (1), wherein the sub-pixels and the display regions corresponding to the least significant bit have a square shape.
(5) The display device according to (2), wherein the electrodes reflect incident light.
(6) An electronic apparatus comprising the display device according to (1).

The present disclosure provides a display device and an electronic apparatus including the same. The display device includes a plurality of pixels each including a plurality of sub-pixels, the sub-pixels are arranged around the center of the pixel and divided into a plurality of display regions, and N-bit area coverage modulation can be performed by a combination of the display regions. The display region corresponding to the least significant bit is arranged closest to the center of the pixel. The display region corresponding to a higher significant bit of the area coverage modulation is arranged around the center of the pixel and away from the center of the pixel. N is a natural number of 2 or more.

The pixel according to the present disclosure has a structure in which the display region corresponding to the least significant bit is arranged closest to the center of the pixel, and the display region corresponding to a higher significant bit of the area coverage modulation is arranged away from the center of the pixel. That is, the display region corresponding to a higher significant bit of the area coverage modulation is arranged around the center of the pixel and around the display region corresponding to a lower bit. Accordingly, the display device and the electronic apparatus including the same according to the present disclosure can achieve clear gradation expression and suppress reduction in an effective reflection area ratio or in the area of divided pixels that contributes to display. As a result, in the present embodiment, it is possible to reduce effects on display quality caused by dividing the sub-pixel, and also reduce degradation in gradation expression.

According to the present disclosure, when the area coverage modulation is performed, it is possible to reduce effects on the display quality caused by dividing the pixel, and reduce degradation in gradation expression.

What is claimed is:
1. A display device comprising:
a plurality of pixels each including a plurality of sub-pixels, each of which is arranged around center of the corresponding pixel,
wherein each of the pixels is divided, by first lines of gaps that radially extend from the center of the corresponding pixel toward outer edges of the corresponding pixel, into a plurality of display regions including a first display region and a second display region to perform N-bit area coverage modulation (N is a natural number of 2 or more) by a combination of respective ones of the plurality of display regions, and
wherein the plurality of display regions are arranged in such a manner that:

the first display region corresponding to a least significant bit of the area coverage modulation is arranged closest to the center of the corresponding pixel; and the second display region corresponding to a most significant bit of the area coverage modulation is arranged around the center of the pixel and further from the center of the corresponding pixel than the first display region.

2. The display device according to claim 1, further comprising:
   a second planarization layer on which a plurality of electrodes corresponding to respective ones of the plurality of display regions are formed;
   a first planarization layer formed between the second planarization layer and a first conductor for applying a video signal to be given to the corresponding electrode; and
   a second conductor arranged between the first planarization layer and the second planarization layer to electrically couple the first conductor to the corresponding electrode.

3. The display device according to claim 2, further comprising:
   a liquid crystal layer arranged between the electrodes and a counter electrode opposite to the electrodes, wherein
   the first display region has first coupling parts at a position close to the center of the corresponding pixel,
   the second display region has second coupling parts at a position at a corner of the corresponding pixel,
   each of the first and second coupling parts is coupled to the corresponding second conductor, and
   spacers for forming a space to form the liquid crystal layer are formed at the positions of the first coupling parts.

4. The display device according to claim 2, wherein the electrodes reflect incident light.

5. The display device according to claim 1, wherein the sub-pixels and the display regions corresponding to the least significant bit have a square shape.

6. The display device according to claim 1, wherein
   each of the pixels is divided by the first lines into four equal areas corresponding to the sub-pixels, and
   the sub-pixels are a first sub-pixel, a second sub-pixel, a third sub-pixel, and a fourth sub-pixel.

7. The display device according to claim 6, wherein
   the first display region has first coupling parts at a position close to the center of the corresponding pixel, and
   the second display region has second coupling parts at a position at a corner of the corresponding pixel.

8. The display device according to claim 6, wherein
   each of the sub-pixels are divided into the first display region, the second display region, and a third display region, wherein the third display region corresponds to a more significant bit of the area coverage modulation than the first display region and to a less significant bit of the area coverage modulation than the second display region.

9. The display device according to claim 8, wherein
   the third display region is arranged around the first display region,
   the first display region has first coupling parts at a position close to the center of the corresponding pixel,
   the second display region has second coupling parts at a position at a corner of the corresponding pixel, and
   the third display region has third coupling parts each arranged at a position that is a corner of the respective sub-pixel corresponding to a corner of the third display region.

10. The display device according to claim 1, wherein
    each of the pixels has a hexagonal shape,
    each of the pixels is divided by the first lines into three equal areas corresponding to the sub-pixels, and
    the sub-pixels are a first sub-pixel, a second sub-pixel, and a third sub-pixel.

11. The display device according to claim 10, wherein
    the first display region has first coupling parts at a position close to the center of the corresponding pixel, and
    the second display region has second coupling parts at a position at a corner of the corresponding pixel.

12. An electronic apparatus comprising the display device according to claim 1.

* * * * *